(12) United States Patent
Jenkins et al.

(10) Patent No.: US 7,428,351 B2
(45) Date of Patent: Sep. 23, 2008

(54) OPTICAL CIRCUIT FABRICATION METHOD AND DEVICE

(75) Inventors: Richard M Jenkins, Malvern (GB); Mark E McNie, Malvern (GB)

(73) Assignee: QinetiQ Limited, Farnborough, Hants (GB)

( * ) Notice: Subject to any disclaimer, the term of this patent is extended or adjusted under 35 U.S.C. 154(b) by 0 days.

(21) Appl. No.: 11/637,214

(22) Filed: Dec. 12, 2006

(65) Prior Publication Data

US 2007/0165980 A1 Jul. 19, 2007

Related U.S. Application Data

(63) Continuation of application No. 10/502,847, filed as application No. PCT/GB03/00331 on Jan. 28, 2003, now abandoned.

(30) Foreign Application Priority Data

Jan. 28, 2002 (GB) .................................. 0201969.3

(51) Int. Cl.
G02B 6/12 (2006.01)
(52) U.S. Cl. ........................................ 385/14; 385/129
(58) Field of Classification Search ........................ None
See application file for complete search history.

(56) References Cited

U.S. PATENT DOCUMENTS

| | | | |
|---|---|---|---|
| 4,068,920 A | 1/1978 | Bass et al. | |
| 4,453,803 A | 6/1984 | Hidaka et al. | |
| 4,973,127 A | 11/1990 | Cannon, Jr. et al. | |
| 5,195,154 A * | 3/1993 | Uchida | 385/88 |
| 5,279,354 A | 1/1994 | Grove | |
| 5,379,354 A | 1/1995 | Jenkins | |
| 5,410,625 A | 4/1995 | Jenkins et al. | |
| 5,428,698 A | 6/1995 | Jenkins et al. | |
| 5,473,721 A | 12/1995 | Myers et al. | |
| 5,475,776 A | 12/1995 | Jenkins et al. | |
| 5,515,464 A * | 5/1996 | Sheem | 385/49 |
| 5,562,838 A | 10/1996 | Wojnarowski et al. | |
| 5,611,008 A | 3/1997 | Yap | |

(Continued)

FOREIGN PATENT DOCUMENTS

DE 35 42 614 6/1987

(Continued)

OTHER PUBLICATIONS

T. Saida et al, "Silica-Based 2×2 Multimode Interferance Couplers with Arbitrary Power Splitting Ratio" *Extended Abstracts of the 1999 International Conference on Solid State Devices and Materials*, 1999, pp. 458-459.

(Continued)

*Primary Examiner*—Sung H Pak
(74) *Attorney, Agent, or Firm*—Nixon & Vanderhye P.C.

(57) ABSTRACT

A photonic light circuit device is described that comprises a semiconductor substrate (220) and two or more optical components (226, 228, 236, 240) wherein one or more hollow core optical waveguides (230, 232, 224) are formed in the semiconductor substrate to optically link said two or more optical components. The PLC may comprise a lid portion (44) and a base portion (42). The PLC can be adapted to receive optical components (8:608) or optical components may be formed monolithically therein. Coating with a reflective layer is also described.

44 Claims, 13 Drawing Sheets

U.S. PATENT DOCUMENTS

| | | | |
|---|---|---|---|
| 5,632,908 A | | 5/1997 | Shahid |
| 5,675,603 A | | 10/1997 | Jenkins |
| 5,737,458 A | | 4/1998 | Wojnarowski et al. |
| 5,917,596 A | * | 6/1999 | Jenkins et al. ............... 356/491 |
| 6,002,514 A | | 12/1999 | Barrett et al. |
| 6,090,636 A | | 7/2000 | Geusic et al. |
| 6,137,941 A | | 10/2000 | Robinson |
| 6,163,643 A | | 12/2000 | Bergmann et al. |
| 6,198,857 B1 | * | 3/2001 | Grasis et al. .................. 385/24 |
| 6,219,470 B1 | | 4/2001 | Tu |
| 6,315,462 B1 | | 11/2001 | Anthamatten et al. |
| 6,340,605 B1 | | 1/2002 | Kawanishi et al. |
| 6,501,869 B1 | | 12/2002 | Athale |
| 6,640,021 B2 | * | 10/2003 | Pogge et al. .................. 385/14 |
| 6,819,825 B2 | * | 11/2004 | Takeuchi et al. .............. 385/18 |
| 6,839,478 B2 | * | 1/2005 | Huber et al. .................. 385/16 |
| 2002/0102059 A1 | | 8/2002 | Cho |
| 2002/0191907 A1 | | 12/2002 | Kinoshita |
| 2003/0035613 A1 | | 2/2003 | Huber et al. |
| 2003/0090776 A1 | | 5/2003 | Vaganov |

FOREIGN PATENT DOCUMENTS

| | | |
|---|---|---|
| EP | 0 043 475 | 1/1982 |
| EP | 0 128 800 | 12/1984 |
| EP | 0 221 288 | 5/1987 |
| EP | 0 718 657 | 6/1996 |
| EP | 0 903 616 | 3/1999 |
| EP | 1 010 999 | 6/2000 |
| EP | 1010999 A | 6/2000 |
| EP | 1 103 831 | 5/2001 |
| EP | 1103831 A | 5/2001 |
| EP | 0 876 625 | 7/2002 |
| GB | 2 014 752 | 8/1979 |
| GB | 2 189 621 | 10/1987 |
| GB | 2 193 816 | 2/1988 |
| JP | 3025815 | 2/1991 |
| JP | 09184937 A | 7/1997 |
| JP | 10-311921 | 11/1998 |
| JP | 10311921 A | 11/1998 |
| WO | WO 93/25923 | 12/1993 |
| WO | 9857206 A | 12/1998 |
| WO | WO 98/57206 | 12/1998 |
| WO | 9915934 A | 4/1999 |
| WO | WO 99/15934 | 4/1999 |
| WO | WO 01/38921 | 5/2001 |
| WO | 0161390 A | 8/2001 |
| WO | WO 01/59492 | 8/2001 |
| WO | WO 01/61390 | 8/2001 |
| WO | WO 01/75503 | 10/2001 |
| WO | WO 01/86825 | 11/2001 |
| WO | WO 02/10801 | 2/2002 |
| WO | WO 02/31551 | 4/2002 |

OTHER PUBLICATIONS

S. Lee et al, "InGaAsP/InP Multimode Interface Splitter with Variable Splitting Ratio" *Proceedings of the SPIE*, vol. 3944, Jan. 2000, pp. 673-678.

R. Dangel, "Electro-Nanomechanically Actuated Integrated-Optical Interferometric Intensity Modulators and 2×2 Space Switches" *Optics Communications*, vol. 156, No. 1-3, Nov. 1998, pp. 63-76.

H. Takahashi, "Transmission Characteristics of Arrayed Waveguide N×N Wavelength Multiplexer", *Journal of Lightwave Technology*, vol. 13, No. 3, Mar. 1995, pp. 447-455.

T. Miura et al, "Hollow Optical Waveguide for Temperature-Insensitive Photonic Integrated Circuits" *J. Appl. Phys.* vol. 40, 2001, pp. 688-690.

C. Rabii et al, "Optical Properties of Dual-Core Hollow Waveguides" *Applied Optics*, vol. 35, No. 31, Nov. 1996, pp. 6249-6252.

A.D. Norte et al, "Multiple-Layer Optical Interconnections Using Through-Wafer Hollow-Dielectric-Waveguide Vias" *IEEE Photonics Technology Letters*, vol. 6, No. 7, Jul. 1994, pp. 351-354.

T. Miura et al, "Propagation Characteristics of Hollow Optical Waveguide for Temperature-Insensitive Photonic Integrated Circuits" *Japanese Journal of Applied Physics*, vol. 40, No. 7A, Jul. 2001.

J.N. McMullin et al, "Hollow Metallic Waveguides in Silicon V-Grooves" *IEEE Photonics Technology Letters*, vol. 5, No. 9, Sep. 1993, pp. 1080-1082.

Patent Abstracts of Japan, vol. 0021, No. 21, Dec. 1978, (JP 53-087746).

Patent Abstracts of Japan, vol. 1997, No. 11, Nov. 1997 (JP 09184937).

Patent Abstracts of Japan, vol. 1999, No. 2, Feb. 1999 (JP 10311921).

R.M. Jenkins et al, "An Integrated Optic Approach to 10um LIDAR" *Conference on Lasers and Electro-Optics in Europe*, Sep. 1998, p. 389.

J. Harrington, "A Review of IR Transmitting, Hollow Waveguides" *Fiber and Integrated Optics*, vol. 9, No. 3, Mar. 2000, pp. 211-227.

R. Bernini et al, "Silicon Micromachined Hollow Optical Waveguides for Sensing Applications" *IEEE Journal on Selected Topics in Quantum Electronics*, vol. 8, No. 1, Jan./Feb. 2002, pp. 106-110.

* cited by examiner

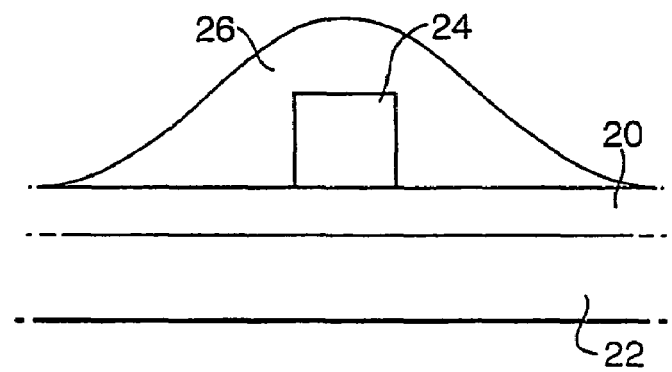
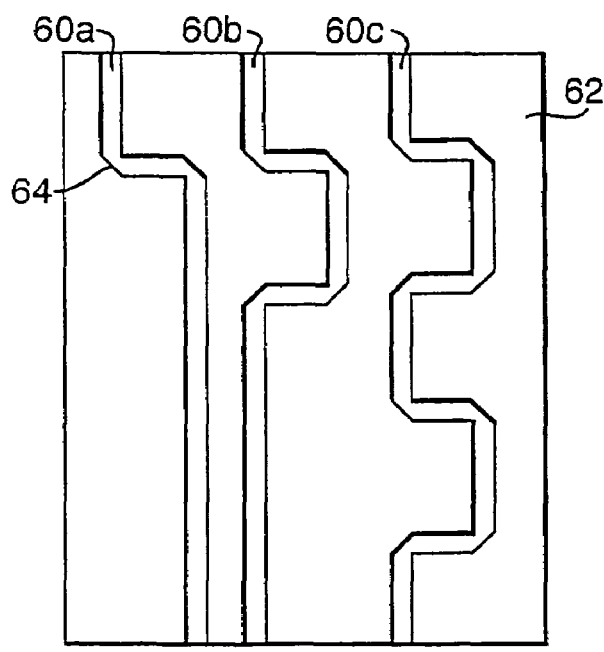
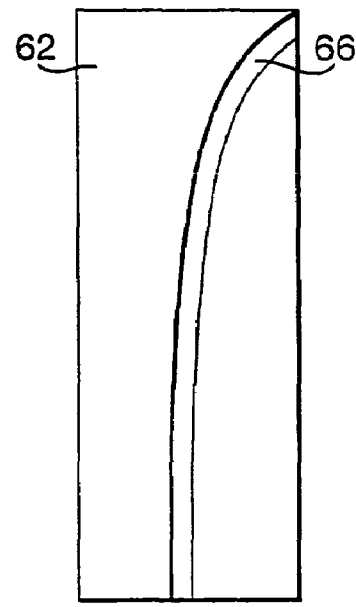

Tapers

"Input Data"
Wavelength=1.55'*^−6
Input Guid Full Width=62.5'um
Taper Expansion=2
Taper Length=1.875'mm
Taper Half Angle=0.0166651237139407504'
No. of Modes=20
Iteration Steps=18750
"Output Data"
Transmission=0.999997794433809161'
EH11/EH13 Ratio=69.0272780543116226'
Fraction of EH11=0.985163006861430723'

OPTICAL CIRCUIT FABRICATION METHOD AND DEVICE

This application is Continuation of application Ser. No. 10/502,847, filed Jan. 29, 2004 which is the U.S. national phase of international application PCT/GB03/00331, filed 28 Jan. 2003, which designated the U.S. and claims priority to GB application 0201969.3 filed 28 Jan. 2002. The entire contents of these applications are incorporated herein by reference.

The present invention relates generally to integrated optics devices, and more particularly to improved photonic light circuit (PLC) devices.

Photonic circuit modules form an integral part of many optical communication, sensor and instrumentation devices. In such photonic circuit devices a number of optical components are rigidly held in place and waveguides, typically lengths of optical fibre, are used to optically connect the components as required. The optical components and interconnecting fibres are held in place on a suitable substrate.

Silicon optical benches (SiOBs) are one example of an assembly technology for photonic circuits. As the name suggests, SiOBs are optical benches formed from silicon or a similar semiconductor material. Grooves and slots are etched in the silicon material, using micro-fabrication processes, to hold the various optical components. The high accuracy of the micro-fabrication process allows the optical components and optical fibres to be precisely aligned relative to one another in the various slots and grooves. This provides so called "passive alignment" of the components and reduces the need to actively ensure the various components of the optical circuit are aligned with one another. Light may also be directed between the various optical components using free space optics such as lenses etc.

It is also known, for example see U.S. Pat. No. 4,902,086 and EP0856755, that it is possible to deposit various layers of material to form waveguides that are integral with the SiOB. Typically a base layer, such as silica, is formed on the silicon substrate. A layer of doped silica with a high refractive index, i.e. the core layer, is then deposited on top of the low refractive index base layer. The core layer is patterned to form appropriate waveguides. Optionally, an upper cladding layer of low refractive index material is also deposited on the patterned core layer. In other words, waveguides are formed directly on the silicon substrate rather than being fabricated as separate optical fibres.

A disadvantage of known photonic circuit devices, including those based on SiOBs, is the high degree of accuracy with which each optical component has to be aligned with the associated waveguides to ensure an efficient optical connection. In addition to ensuring accurate physical alignment of the optical fibres and optical components, it is also necessary to minimise unwanted reflections from the end of each silica waveguide. This requires refractive index matching of the waveguides to the optical components, or the use of a gel or antireflection coating. Lenses may also be required to facilitate the free space coupling of light between components. These requirements increase the complexity, and hence cost, of photonic circuit fabrication.

It is an object of the present invention to mitigate at least some of the disadvantages described above.

According to a first aspect of the invention, a photonic light circuit device comprises a semiconductor substrate and two or more optical components wherein one or more hollow core optical waveguides are formed in the semiconductor substrate to optically link said two or more optical components.

The present invention is advantageous over prior art photonic circuit devices as it removes the requirement to provide optical fibres for interconnects between components or to deposit layers of material to form solid core waveguides. This invention provides a photonic light circuit (PLC) that is easier to fabricate, and hence lower cost, than prior art devices.

A further advantage of linking the components with hollow optical waveguides is the increased optical power the circuit can handle over prior art photonic circuits that use solid core (typically Silica or silicon) waveguides to interconnect the optical components. Furthermore, index matching gels or epoxies, or antireflection coatings are not required on the faces of the waveguides.

The hollow waveguides are formed so as to guide light between optical components of the PLC. The optical components are any devices that will create, detect or act on an optical signal; for example beam splitters/recombiners, etalon structures, lenses, waveplates, modulators, lasers, photo-detectors, or actuated optical components. The term optical component should also be taken to include optical structures, such as surface grating profiles etc, that are formed in or from the hollow waveguides. The hollow core waveguides may be planar or two dimensionally guiding as described below. An optical component may also be an optical fibre cable; for example an optical fibre cable that is used to couple light in to, or out from, the PLC.

Semiconductor substrates can be etched to a high degree of accuracy using micro-fabrication techniques. The substrate may advantageously comprise a multiple layer wafer; for example SiGe or silicon-on-insulator (SOI) or silicon-on-glass. A person skilled in the art would recognise that micro-fabrication techniques typically involve a lithography step to define a pattern, followed by an etch step to transform the pattern in to one or more layers on, or in, the substrate material. The lithography step may comprise photolithography, x-ray or e-beam lithography. The etch step may be performed using ion beam milling, a chemical etch, a dry plasma etch or a deep dry etch (also termed deep silicon etch). Micro-fabrication techniques of this type are also compatible with various layer deposition techniques such as sputtering, CVD and electro-plating.

Advantageously, the semiconductor substrate comprises one or more alignment slots, each alignment slot being adapted to receive in alignment an optical component. The alignment slots are formed to the shape required to accept the optical components and may thus be deeper/shallower and/or wider/narrower than the hollow core optical waveguides.

The alignment slots can thus be fabricated with sufficient accuracy to align the optical component they receive. Placing an optical component in such an alignment slot inherently aligns the optical component and a component alignment or adjustment step is not required. Conventional pick and place techniques of the type used in the manufacture of electronic circuits and the like could be used to place the optical components in the alignment slots.

Alternatively, pick and place techniques may provide the necessary alignment. For example, a component could be accurately aligned when placed and then fixed (e.g. glued) to remain in alignment.

The alignment slots and (especially) the optical components are manufactured with a certain size tolerance. The coupling efficiency between a optical component and an associated hollow core optical waveguide will reduce as the angular error of alignment of the optical component with respect to the hollow core waveguide increases. However, reduction of the cross-sectional dimensions of the hollow core waveguide will increase the acceptable angular alignment tolerance, albeit at the expense of slightly increased losses in the optical waveguide due to the reduced core dimensions and increased (tighter) lateral alignment tolerances. Therefore, knowledge of the alignment tolerances that will be achieved with a certain optical component (e.g. from knowledge of the manufacturing tolerances of the optical component) will permit the dimensions of the hollow core waveguide to be selected to ensure a high coupling efficiency.

The alignment slots may also be formed so as to clamp a solid core optical fibre in place thereby allowing optical inputs/outputs to be made to the PLC. Stepped optical fibre alignment slots may also be provided to hold both the buffer layer and the cladding. The alignment of the core of a hollow core optical fibre with a hollow core waveguide on the PLC, achieved for example by clamping the optical fibre cladding in a alignment slot, would be especially advantageous as the air core to air core connection would be free from any unwanted reflections.

To provide efficient coupling between the core of an optical fibre and a hollow core waveguide of the PLC, the cross-section of the hollow core waveguide should be appropriate for the cross-section of the optical fibre core. In the case of solid core fibres, leakage into the cladding means that the width of the mode carried by the fibre is actually greater than the core diameter; for example typically the 10 μm solid core of a single mode glass fibre has a total field width of around 14 μm diameter. If the mode width is different to that of the hollow core waveguide, lenses (e.g. ball or GRIN rod etc) can be used to expand or reduce the optical field to enable light to be coupled to/from fibres with a different size core to that of the hollow core waveguide of the PLC. Fibre ends of solid core fibres may be anti-reflection.

Conveniently, one or more of the two or more optical components are formed from the material of the semiconductor substrate; i.e. monolithic components may be formed.

Alternatively, some or all of the optical components that make up the PLC, and which are interconnected via the hollow core waveguides formed in the semiconductor substrate, may be attached to the semiconductor substrate as described above; in other words, a hybrid device may be formed.

At least one of said two or more optical components may advantageously comprise a micro-electro-mechanical (MEMS) device. The MEMS component may be hybrid or monolithic. MBMS is taken to include micro-machined elements, micro-systems technology, micro-robotics and micro-engineering. Examples of MEMS optical components include alignment elements, pop-down Fresnel lenses, gyroscopes, moveable mirrors, tuneable Fabry-Perot cavities, adaptive optics elements, switches, variable optical attenuators, filters etc.

Conveniently, the semiconductor substrate forms a base portion of the photonic light circuit device and a lid portion is additionally provided in order to form said hollow core optical waveguides.

Advantageously, one or more optical components are attached to the lid portion. Optical components may be mounted on the lid alone, on the base portion alone, or on both the lid and the base.

The lid portion may be formed from semiconductor material, such as silicon, and advantageously one or more optical components may be formed thereon. Alternatively, the lid portion may be formed from glass. Preferably, the lid should have the same thermal expansion properties as the substrate; for example, by the lid being formed from the same semiconductor material as the substrate.

In the case of lid mounted components, the base portion is etched to form the hollow waveguide structures and to provide recesses for optical components that are formed from, or attached to, the lid portion. Mounting the lid portion on the base portion allows the optical components to be brought into alignment with the optical waveguides of the base portion. A person skilled in the art would recognise that various techniques, such as precision alignment mating parts or wafer or chip alignment tools, may be provided to ensure accurate alignment of the lid and base. Alternatively, some or all of the optical components may be directly mounted in alignment slots formed in the base portion. This enables the lid portion to be mounted on the base portion without a requirement to precisely align the lid and base portions.

Conveniently, the lid portion carries a reflective coating. The reflective coating may cover all, or just selected parts, of the lid portion as required. Advantageously, the reflective coating may comprises a layer of material having a refractive index lower than that of the waveguide core within the operating wavelength band; for example, gold, silver or copper Alternatively, on or more layers of dielectric material or a layer of Silicon Carbide may be provided.

A person skilled in the art would recognise how the lid portion and base portion cold be bonded together. For example, an intermediate layer such as conductive or non-conductive epoxy could be used. Alternatively, and in the case of a metal layer being used as a low refractive index layer, a metal-semiconductor eutectic bond could be formed. Glass frit techniques could be employed to bond the lid to the semiconductor base portion or, if the lid portion is formed from glass, anodic techniques could be used.

Advantageously, the semiconductor substrate comprises silicon. This may be provided in a variety of forms, for example in wafer form (e.g. Si, silicon-on-insulator or silicon-on-glass) or as a epitaxial layer (e.g. SiGe or GaAs) on a Si substrate. Advantageously, SOI is used.

Conveniently, the optical properties of a first internal surface forming one or more of the hollow core optical waveguides are different to the optical properties of a second internal surface forming that hollow core optical waveguide. This enables hollow waveguides to be formed that more efficiently guide light of a certain polarisation as described in more detail with reference to FIG. 6 below.

Advantageously, at least some of the internal surfaces of said one or more hollow core optical waveguides carry a reflective coating.

The reflective coating may advantageously comprise a layer of material having a refractive index lower than that of the waveguide core within the operating wavelength band.

The layer of material having a refractive index lower than the hollow waveguide core provides total internal reflection (TIR) of light within the PLC waveguides, thereby decreasing the amount of optical loss.

It should be noted that when hollow core optical waveguide structures are produced, the hollow core is likely to fill with air. Herein the refractive index of the core is thus assumed to be that of air at atmospheric pressure and temperature (i.e. n≈1). However, this should be seen in no way as limiting the scope of this invention. The hollow core may contain any fluid (for example a liquid or an inert gas such as nitrogen) or be a vacuum. The term hollow core simply means a core which is absent any solid material. Also, the term total internal reflection (TIR) shall be taken herein to include attenuated total internal reflection (ATIR).

Conveniently, the reflective material carried on the internal surface of the hollow core optical waveguides is a metal such as gold, silver or copper. Metals will exhibit a suitably low refractive index over a wavelength range that is governed by the physical properties of the metal; standard text books such as "the handbook of optical constants" by E. D. Palik, Academic Press, London, 1998, provide accurate data on the wavelength dependent refractive indices of various materials. In particular, gold has a refractive index less than that of air at wavelengths within the range of around 500 nm to 2.2 µm; this encompasses wavelengths within the important telecommunications band of 1400 nm to 1600 nm. Copper exhibits a refractive index less than unity over the wavelength range of 560 nm to 2200 nm, whilst silver has similar refractive index properties over a wavelength range of 320 nm to 2480 nm.

A layer of metal may be deposited using a variety of techniques known to those skilled in the art. These techniques include sputtering, evaporation, chemical vapour deposition (CVD) and (electro or electro-less) plating. CVD and plating techniques allow the metal layers to be deposited without significant direction dependent thickness variations. Sputtering using a rotating sample and/or source would also provide even coverage. Plating techniques are especially advantageous as they permit batch (i.e. multi-substrate parallel) processing to be undertaken.

A skilled person would recognise that adhesion layers and/or barrier diffusion layers could be deposited on the hollow waveguide prior to depositing the layer of metal. For example, a layer of chrome or titanium could be provided as an adhesion layer prior to the deposition of gold. A diffusion barrier layer, such as platinum, may also be deposited on the adhesion layer prior to gold deposition. Alternatively, a combined adhesion and diffusion layer (such as titanium nitride, titanium tungsten alloy or an insulating layer) could be used.

Conveniently, the reflective coating may be provided on the internal surfaces of the hollow waveguides (including any lid portion) by an all-dielectric, or a metal-dielectric, stack. A person skilled in the art would recognise that the optical thickness of the dielectric layer(s) provides an interference effect that will determine the reflective properties of the coating. The dielectric material may be deposited by CVD or sputtering or reactive sputtering. Alternatively, a dielectric layer could be formed by chemical reaction with a deposited metal layer. For example, a layer of silver could be chemically reacted with a halide to produce a thin surface layer of silver halide.

In other words the reflective coating may be provided by an all-dielectric, or a metal-dielectric, stack. A person skilled in the art would recognise that the optical thickness of the dielectric layer(s) gives the required interference effects and thus determines the reflective properties of the coating. The reflective properties of the coating may also be dependent, to some extent, on the properties of the material in which the hollow core waveguides are formed. Hence, the underlying semiconductor substrate may also form a base layer, and be a part of, any such multiple layer dielectric stack.

Furthermore, the layer of material carried on the internal surface of the hollow core waveguides is conveniently Silicon Carbide.

As described above, the additional layer of low refractive index material can be selected to provide efficient operation at any required wavelength. Silcon Carbide has a refractive index of 0.06 at 10.6 µm, making such material particularly suited for inclusion in devices operating at such a wavelength.

Advantageously, at least one of the one or more hollow core optical waveguides have a substantially rectangular (which herein shall include square) cross-section. A square, or almost square, cross-section hollow core waveguide provides a waveguide in which the losses are substantially polarisation independent and is preferred when the polarisation state of the light is unknown or varying.

Preferably, the rectangular hollow core optical waveguide has a first cross-sectional dimension parallel to a first waveguide wall and a second cross-sectional dimension orthogonal to said first cross-sectional dimension wherein the first cross-section dimension is at least 5% or 10% or 15% or 25% or 50% greater than the second cross-sectional dimension. As described with reference to FIG. 7d below, such a waveguide is preferred for linearly polarised light of known polarisation.

Advantageously, the refractive indices of the surfaces defining the at least one rectangular internal cross-section hollow core optical waveguide are substantially equal. This can reduce polarisation dependent losses in the waveguide.

Preferably, opposite surfaces forming the rectangular internal cross-section hollow core optical waveguide have substantially equal effective refractive indices and adjacent surfaces forming the rectangular internal cross-section hollow core optical waveguide have different effective refractive indices. As described with reference to FIGS. 7a to 7c below, tailoring the refractive indies of opposing pairs of waveguide walls enables transmission losses to be reduced when guiding light of a known linear polarisation.

Advantageously, a pair of opposed surfaces of the rectangular internal cross-section hollow core optical waveguide carry a high refractive index coating. This provides the high refractive index preferred when s-polarised light is to be reflected as described below.

The semiconductor material of the substrate may also be doped to modify its optical properties to reduce hollow core waveguide losses.

Conveniently, at least one of the one or more hollow core optical waveguides support fundamental mode propagation. Also, at least one of the one or more hollow core optical waveguides may advantageously support multi-mode propagation. Preferably, the multi-mode region is of a length such that re-imaging occurs as described in more detail below.

A person skilled in the art would recognise that the shape and dimensions of the hollow waveguide will affect the associated optical guiding properties. For example, tapered hollow waveguides could be used to provide a beam expansion or compression function. The high resolution with which hollow core waveguides can be fabricated using micro-fabrication techniques allows the guiding properties to be tailored as required to optimise PLC operation. A person skilled in the art would however recognise that the shape of the hollow core optical waveguides may be dictated to some extent by the type of micro-fabrication process used. For example, v-grooves can readily be wet etched in [100] silicon whilst rectangular waveguides can be easily provided in [110] silicon by wet etching. However, deep reactive ion etching (DRIE) provides the greatest ease of manufacture.

Advantageously, the device is provided for operation with radiation within the wavelength ranges of 0.1 µm to 20 µm, 0.8 µm to 1.6 µm or more preferably in the range of 1.4 µm to 1.6 µm. The optical properties of gold, silver and copper coating therefore make these metals particularly suited to inclusion in PLC devices for operation in the telecommunications wavelength band (i.e. for use with wavelengths centred around 1.55 µm). Advantageously, the device may operate in the thermal infra-red bands of 3-5 µm or 8-12 µm.

Conveniently, the semiconductor substrate comprises at least one alignment slot arranged to receive an optical fibre cable and to optically couple said optical fibre cable with one of said one or more hollow core optical waveguide of the semiconductor substrate.

Furthermore, a mode matching means may be advantageously provided in the vicinity of the alignment slot to allow coupling between the modes of an optical fibre and the analogous modes of a hollow core optical waveguide of a different core diameter. For example, in the case of a fundamental mode optical fibre the mode matching means couples the fundamental mode of the fibre and the fundamental mode of the hollow core waveguide. In the case of multi-mode propagation, the mode spectrum of the optical fibre is matched to the mode spectrum of the hollow core waveguide. The mode matching means may advantageously comprise a GRIN rod, a ball lens, a conventional lens or a Fresnel lens.

Alternatively, the alignment slot may be arranged to received a lensed optical fibre. Preferably, the alignment slot is arranged to receive a hollow core optical fibre. The optical fibre may be multi-mode or single mode.

Advantageously, at least one of said two or more optical components comprises a mirrored surface that is angled to direct light out of the plane of the semiconductor substrate. The mirrored surface may be a monolithic (e.g. an angled semiconductor surface as described in FIG. 15) or hybrid arrangement. In other words, the PLC is not restricted to guiding light in the plane of the substrate surface. Light may be directed out of the plane of the substrate. For example, stacked or three dimensional PLCs could be fabricated in accordance with this invention.

Conveniently, the PLC may further comprise at least one micro-wave component and/or a hollow core microwave waveguide. In other words, an optical/microwave hybrid circuit may be provided.

According to a second aspect of the invention, a base portion for a photonic light circuit comprises a semiconductor substrate having one or more hollow channels formed therein, wherein said base portion is arranged such that when combined with an appropriate lid portion at least one hollow core optical waveguide is formed.

Conveniently, at least one slot is formed in the semiconductor substrate of the base portion to receive in alignment an optical component.

According to a third aspect of the invention, a base portion for a photonic light circuit comprises a semiconductor substrate in which one or more hollow waveguide channels and at least one slot to receive in alignment an optical component are formed.

According to a fourth aspect of the invention, a method of fabricating a photonic light circuit comprising the steps of taking a base portion according to the second or third aspects of the invention and attaching a lid thereto.

According to a fifth aspect of the invention a method of fabricating a photonic light circuit device comprises the step of micro-fabricating one or more hollow channels in a semiconductor substrate that are suitable, in use, for acting as hollow core waveguides.

Conveniently, the additional step of fabricating slots in the semiconductor substrate for the appropriate passive alignment of optical components therein is performed. The slots may be fabricated using micro-fabrication techniques, or by precision engineering techniques such as laser machining.

Advantageously, the method comprises the additional step of coating the internal surfaces of the hollow channel(s) with a layer of material having a refractive index lower than that of the waveguide core within the operating wavelength band.

According to a sixth aspect of the invention, a method of forming a photonic light circuit comprising the steps of (a) taking a semiconductor substrate in which at least one hollow core optical waveguide and at least one slot to receive an optical component are formed, and (b) introducing an optical component into the at least one slot, whereby the step of introducing the optical component into the at least one slot also acts so as to align said optical component.

According to a seventh aspect of the invention, a master suitable for forming a pattern in a layer of deformable material is provided wherein the master comprises semiconductor material appropriately patterned to form in said deformable material at least one hollow waveguide channel and at least one alignment slot wherein said at least one alignment slot is arranged to receive in alignment an optical component.

Alternatively, a master could be formed in semiconductor material that allows production of a sub-master. The sub-master may then be used to form the required pattern in a deformable material to define a PLC. A master or sub-master may also be used as a mould to form the required pattern in a fixable layer.

According to an eighth aspect of the invention a method of forming a photonic light circuit comprising the steps of; (a) using a master according to the seventh aspect of the invention to permanently form a pattern in a layer of deformable material and (b) introducing at least one optical component into the at least one alignment slot formed in the deformable material.

A photonic light circuit device is thus described that comprises a semiconductor substrate wherein one or more hollow core optical waveguides are formed in the semiconductor substrate.

The invention will now be described, by way of example only, with reference to the accompanying drawings in which;

FIG. 2 shows a integrated solid core waveguide as used in certain prior art SiOB devices;

FIG. 4 shows a number of hollow core waveguides according to the present invention;

Figure 6:
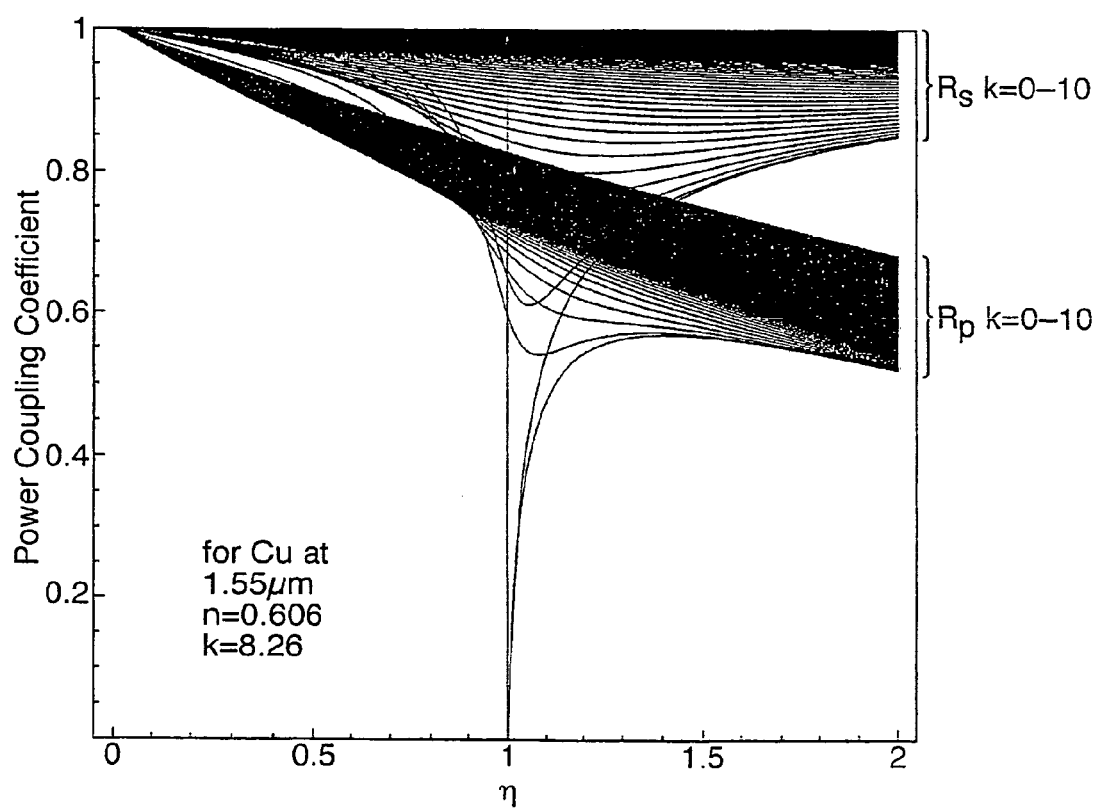
Figure 8A:
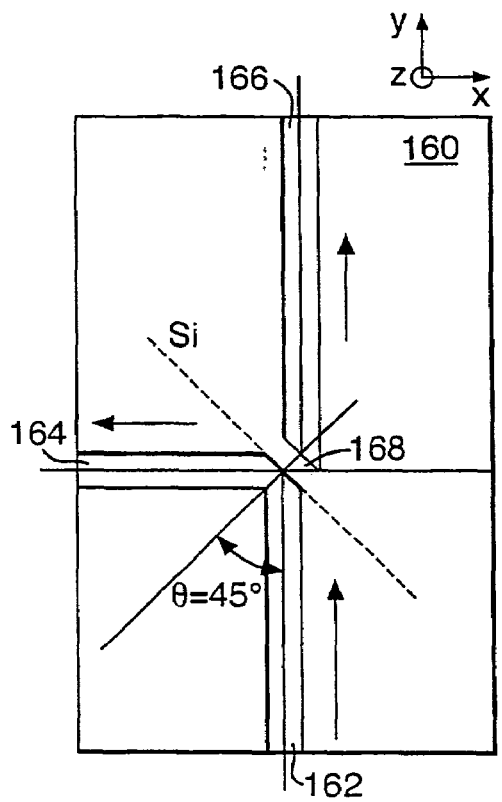
Figure 8B:
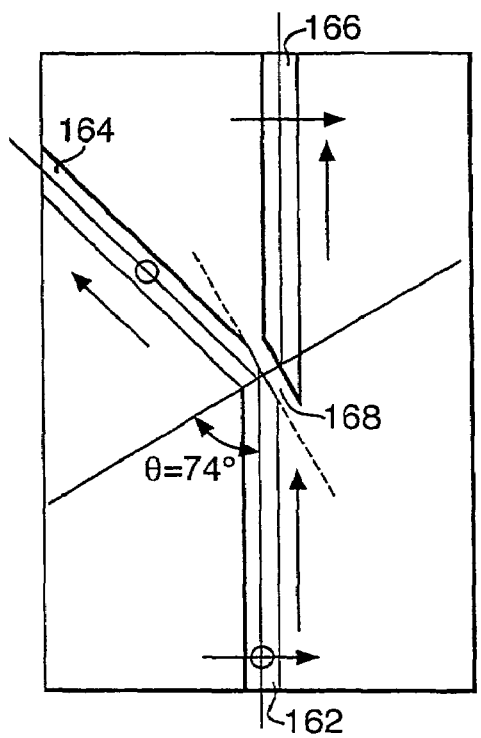
Figure 8C:
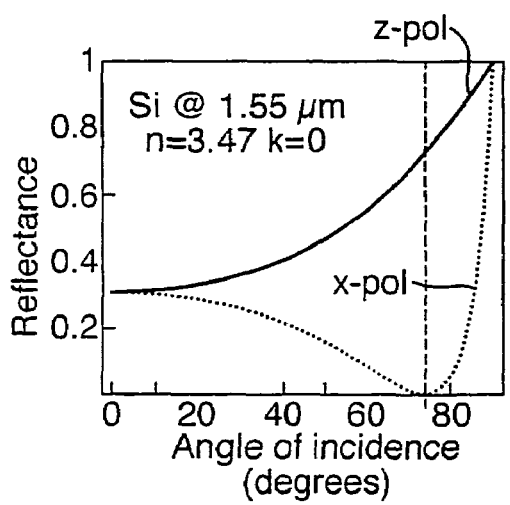
Figure 9A:
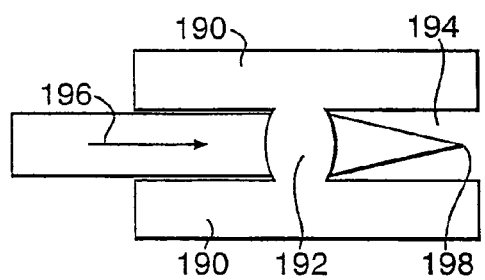
Figure 9B:
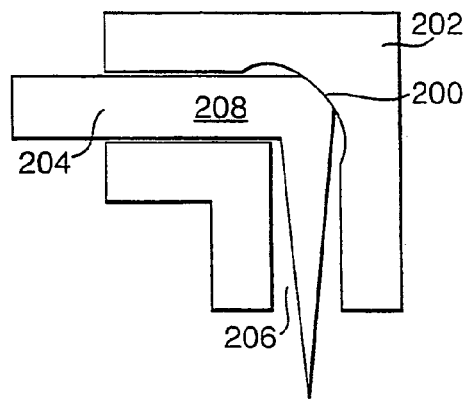
Figure 10:
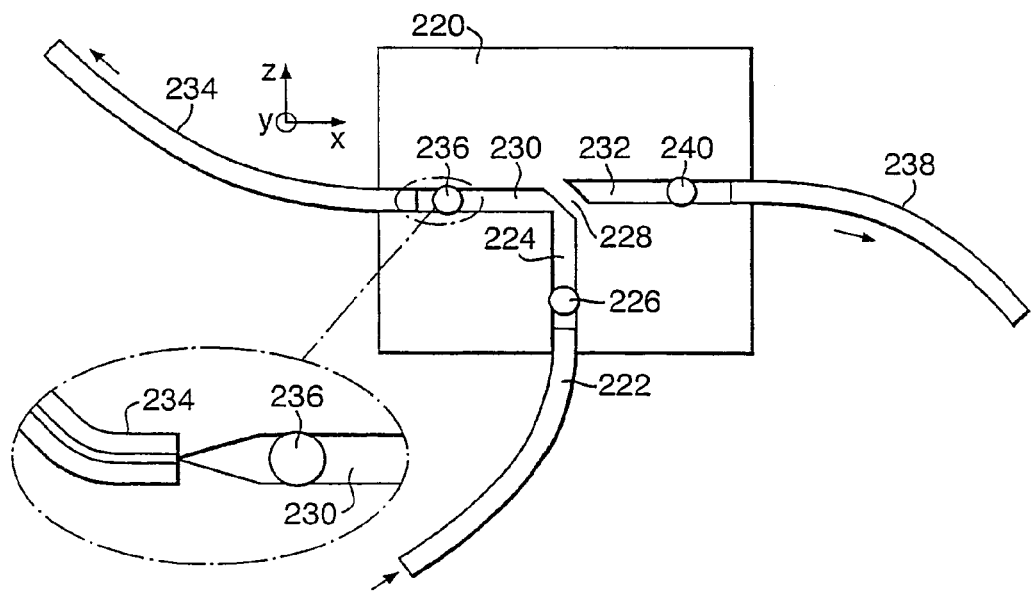
Figure 12A:
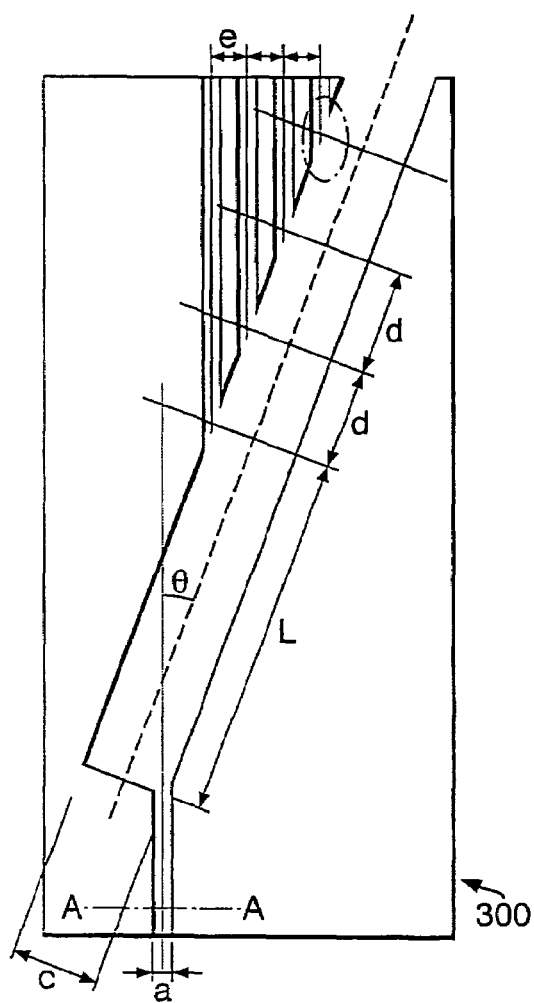
Figure 12B:
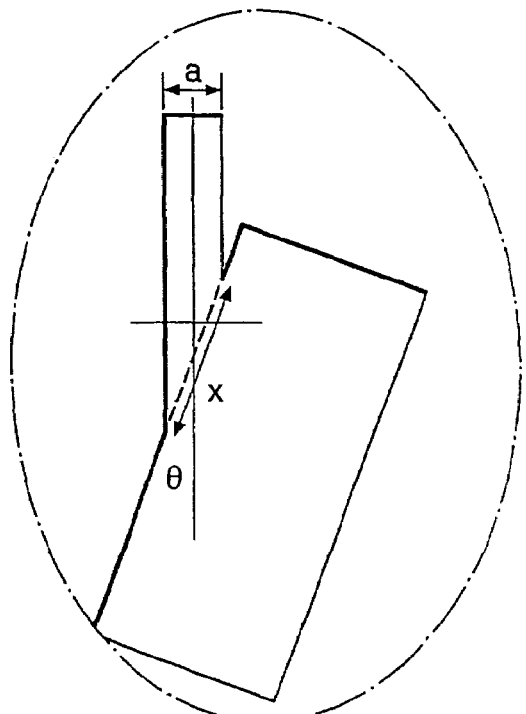
Figure 12C:
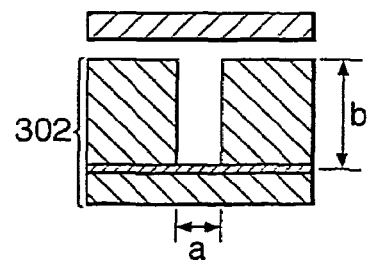
Figure 13:
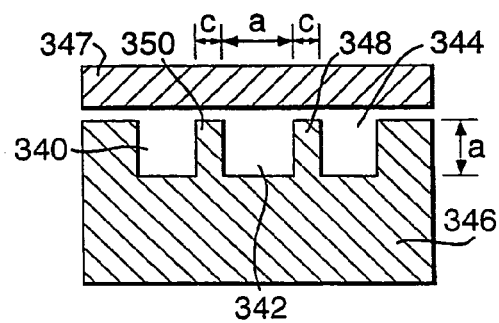
Figure 15:
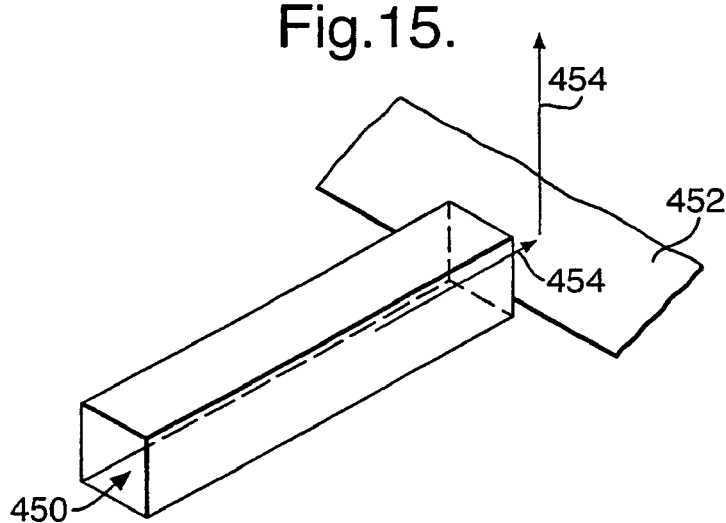
Figure 16:
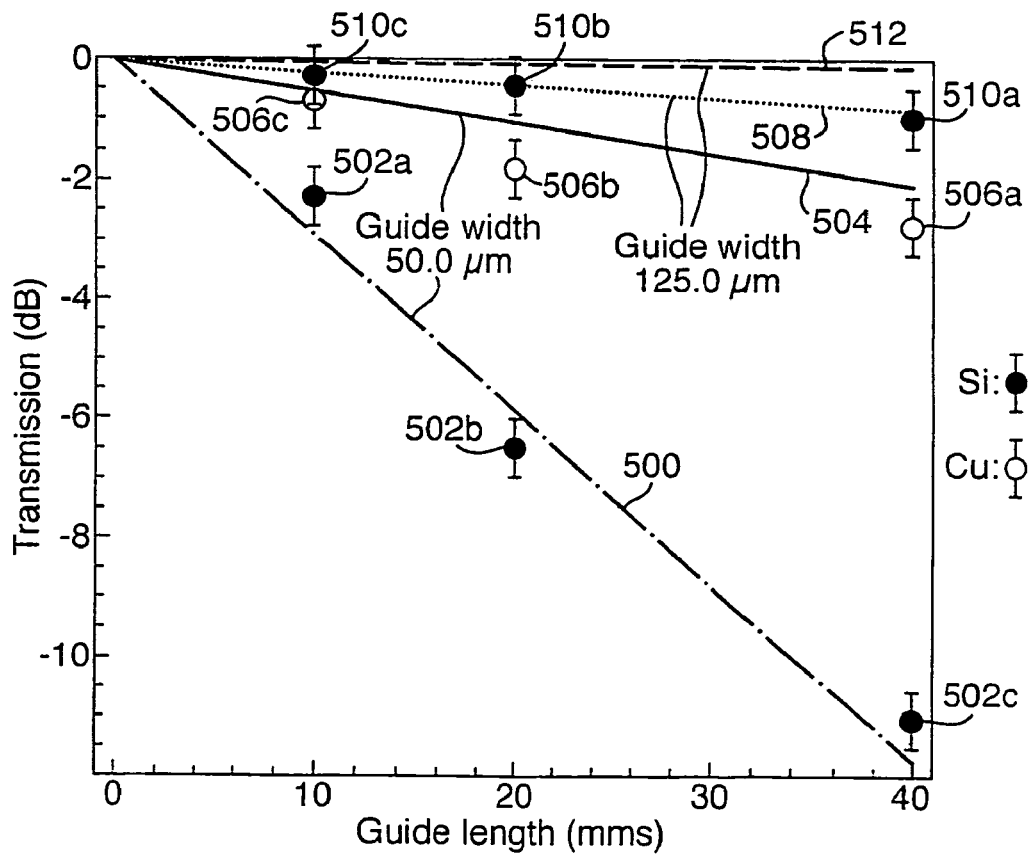

FIG. 5 gives cross-sectional views of various hollow core waveguides;

FIG. 6 shows the Fresnel reflectance coefficient of a copper coated surface for s-polarised and p-polarised light;

FIG. 7 provides a cross sectional view of four additional hollow core waveguides;

FIG. 8a shows a hollow core beamsplitter, FIG. 8b shows a Brewster plate and FIG. 8c shows the reflectivity of silicon as a function of the angle of incidence of s-polarised and p-polarised light;

FIG. 9 illustrates a monolithic lens (FIG. 9a) and focussing mirror (FIG. 9b) fabricated in a Silicon substrate;

FIG. 10 illustrates a PLC in which light is coupled into and out of optical fibre cables;

FIG. 11 shows a tapered waveguide formed in a silicon substrate;

FIG. 12 shows a hollow core wavelength de-multiplexer formed in a silicon substrate;

FIG. 13 shows a hollow core proximity coupler;

FIG. 14 show a PLC having both hollow core and solid core waveguides;

FIG. 15 shows a PLC having a mirrored surface angled to couple light out of the plane of the substrate;

FIG. 16 show the optical loss of hollow core waveguides uses in PLCs of the present invention;

FIG. 17 illustrates the effect of angular misalignment;

FIG. 18 illustrates the effect of lateral misalignment; and

Figure 19:
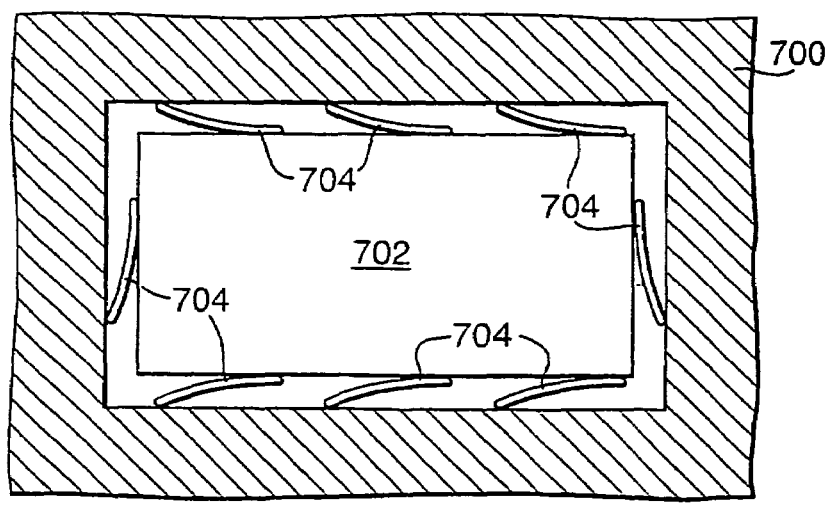

FIG. 19 shows a means of holding a component in alignment in an alignment slot.

Referring to FIG. 1, typical prior art silicon optical bench apparatus is shown.

Figure 1A:
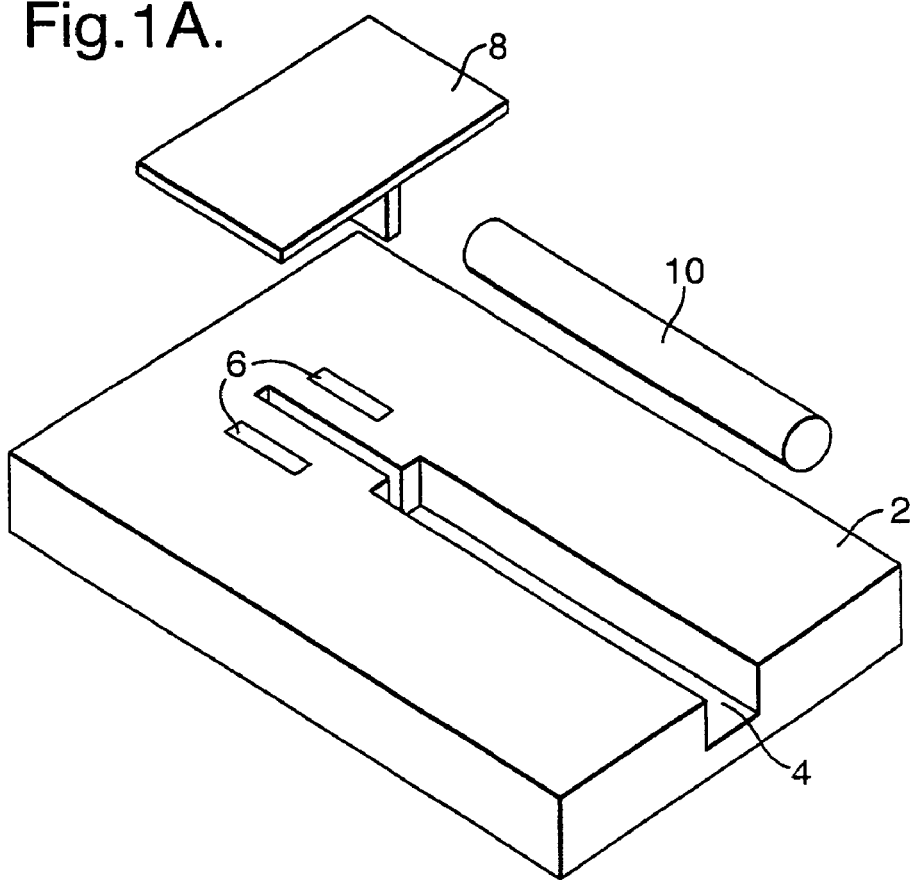
FIG. 1 shows a typical prior art SiOB comprising a plurality of optical components.

FIG. 1a shows a silicon optical bench 2 having a microfabricated hollow channel 4 and a pair of solder connectors 6. The silicon optical bench 2 is configured to hold a laser 8 and a silica optical fibre cable 10.

Figure 1B:
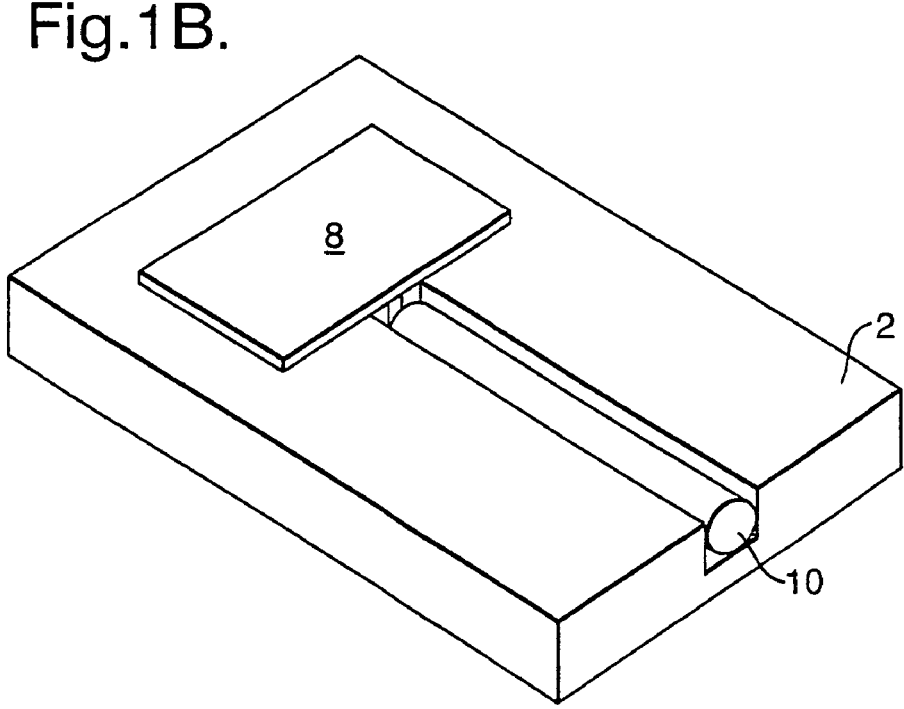

FIG. 1b shows the silica optical fibre 10 and the laser diode 8 mounted on the silicon optical bench 2. The hollow channel 4 is formed with high enough precision so that the optical output from the laser 8 is precisely aligned with the end of the silica optical fibre 10. The solder connectors 6 provide an electrical connection and attach the laser diode 8 to the substrate.

To minimise unwanted reflections from the end of each silica waveguide an antireflection coating (not shown) is provided. Alternatively, the silica waveguides can be refractive index matched (e.g. using an index matching gel) and connected directly to each of the optical components. The requirement for anti-reflection coatings and/or index matching adds to the cost of the overall device, and makes fabrication more complex and time consuming.

Although, for simplicity, a single optical fibre cable (i.e. silica optical fibre cable 10) and a optical component (i.e. the laser 8) are shown in FIG. 1, a person skilled in the art would recognise that complex multi-component photonic circuits can be fabricated using the same principle. Many optical components can be located on the silicon optical bench, and optical links can be established between the components using various lengths of silica optical fibre waveguides. The optical components may include, for example, optical modulators, beam splitters, beam recombiners, detectors etc.

Referring to FIG. 2, a prior art integrated optical waveguide for use as part of a silicon optical bench is shown.

A low refractive index silica layer 20 is deposited on the silicon optical bench substrate 22. A high refractive index layer of doped silica is formed on the silica layer 20, and a high refractive index waveguide core 24 is formed by etching away portions of the high index layer of doped silica. A capping layer 26 of low refractive index silica covers the high refractive index waveguide core 24.

The high refractive index waveguide core 24 acts as an optical waveguide, and the high refractive index of the core compared to the cladding provides light guiding by total internal reflection. This provides a optical waveguide that is integral with, and not merely held in connection with, the silicon optical bench. Solid core integral optical waveguides are thus a known alternative to optical fibres mounted in grooves on a silicon optical bench. However the use of integrated optical waveguide does not lessen the requirement to index match the waveguides to the optical components, or provide anti-reflection coatings. Depositing additional layers of material on the silicon substrate also increases the fabrication complexity of the photonic circuit.

Figure 3A:
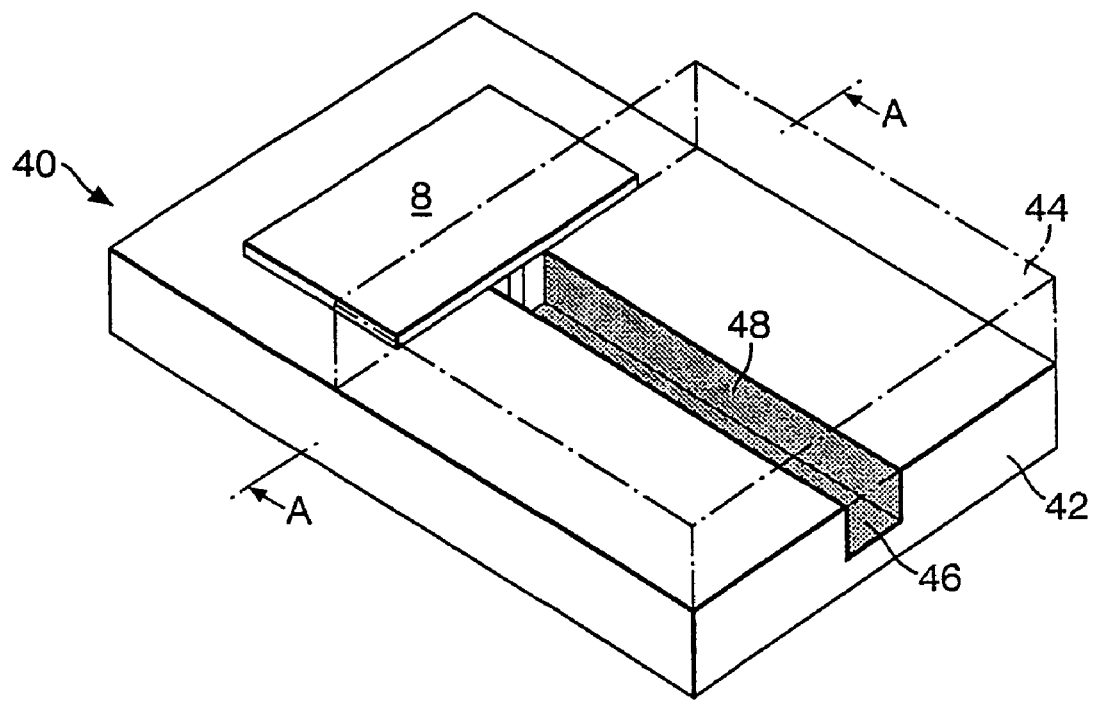
FIG. 3 shows a portion of a PLC according to the present invention.
Figure 3B:
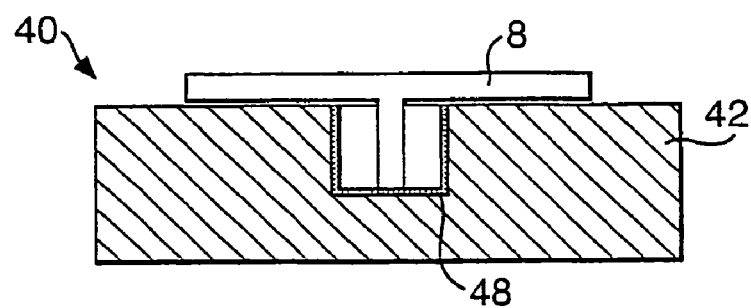

Referring to FIG. 3, a hollow core waveguide photonic light circuit (PLC) 40 that forms part of a device of the present invention is shown; FIG. 3a giving a perspective view of the PLC and FIG. 3b showing a cross-section of the PLC along the dashed line marked "A" in FIG. 3a.

The hollow core waveguide PLC 40 comprises a silicon base 42 and a silicon lid 44. A laser 8 is attached to and aligned in the silicon base 42. Light emitted by the laser 8 is coupled in to the single mode hollow core waveguide 46 that is formed by the silicon base and the silicon lid 44. In other words, hollow core waveguides are formed directly in the silicon from which the PLC base and lid are fabricated. For simplicity, electrical connections to the laser 8 are not shown as a person skilled in the art would recognise the various ways in which electrical connections could be made; for example, track implantation using diode isolation in the base 42.

The hollow core waveguide 46 of FIG. 3 can be seen to have a rectangular cross section. The use of rectangular waveguides (herein the term rectangular shall include square) having a substantially equal depth and width reduces polarisation dependent losses which can provide advantageous in many telecommunication applications.

Although rectangular waveguides are shown, the waveguide cross-section could be shaped as required. For example, circular or parabolic cross-section or V-shaped waveguides could be formed in the silicon base using appropriate etching techniques. Hollow waveguide structures could also be formed in the silicon lid 44. However, this requires both the base and the lid to be patterned and also means the lid and base have to be precisely aligned. The dimensions of the hollow core waveguide can be selected to support fundamental mode or multi-mode propagation as required and are described in more detail below.

In the example described with reference to FIG. 3, Silicon is used to form the PLC as it can be etched to a very high degree of accuracy using micro-fabrication techniques of the type known to those skilled in the art. However, a person skilled in the art would also recognise that any micro-fabricated semiconductor material could be employed to form a PLC of the present invention.

The laser 8 is a separate component that is bonded to the silicon base 42; in other words it is a hybrid arrangement. A person skilled in the art would also recognise that it would be possible to bond the laser 8 to a lid, or to fabricate optical components in the silicon itself. Although only a laser 8 is described with reference to FIG. 3, many optical components could be located or formed and/or aligned on the silicon base or lid. Alignment slots formed in the lid may also be used to receive in alignment optical components. This technique thus allows complex multi-component PLCs to be fabricated. The optical components may include, for example, optical modulators, beam splitters, beam recombiners, detectors, gratings, mirrors, GRIN (graded refractive index) lenses etc. Examples of some of the types of optical components that could be formed in a PLC of the present invention are described in more detailed below.

To maximise optical transmission through the hollow core waveguide 46, a layer of gold 48 is provided on the internal surface of the hollow core waveguides 46. The deposition of a layer of gold onto the silicon base and lid can be readily achieved, for example using appropriate metal deposition techniques such as sputtering or plating.

The lid may be bonded to the base in a variety of ways known to those skilled in the art. Areas of silicon that do not form part of the hollow optical waveguides may be left exposed on the lid portion and/or the base portion, and the lid and base may be bonded via a gold-silicon eutectic bond. Silver loaded epoxy, solder or polymer adhesive may also be used to bond the lid and base. The lid may only cover a part of the base as required.

The presence of the layer of gold 48 provides ATIR within the hollow core device for light with a wavelength within the telecommunications wavelength band (i.e. for wavelengths around 1.55 µm). At these telecommunication wavelengths, gold has the required refractive index properties of $n<1$.

Although a gold layer 48 is described, a person skilled in the art would recognise that any material having a refractive index less than air (or whatever is contained within the cavity) at the wavelengths at which the waveguide is to be operated could be deposited on the surfaces defining the hollow core waveguide. The refractive indices of different materials can be found in various publications, such as "the handbook of optical constants" by E. D. Palik, Academic Press, London, 1998. Metals typically posses a refractive index less than air over a given wavelength range; the particular wavelength range depending on the physical properties of the metal.

It should be noted that although the layer of gold 48 provides ATIR, coating the hollow core waveguide 46 with an additional layer of low refractive index material is not essential. The refractive index of silicon is around 3.4 at wavelengths between 0.5 µm and 300 µm, and hence hollow core (i.e. air filled) waveguides formed from uncoated silicon will not provide ATIR of light within such a wavelength range. However, uncoated silicon will still provide light guiding by way of Fresnel reflection. Hollow core waveguides that use Fresnel reflections to guide light will, introduce more optical loss than waveguides that provide TIR, but in certain situations this increased level of optical loss is acceptable.

If a reflective coating is provided, the substrate may be formed from a micro-fabricated material other than a semiconductor. For example, plastic waveguide devices may be fabricated by techniques including hot embossing or injection moulding. The technique involves forming a master. The master may be formed in semiconductor material, such as silicon, using a deep dry etch. Alternatively, the master may be formed by electro deposition of layers using the LIGA or UV LIGA technique. Once the master is formed, the hollow core waveguides may be formed in a plastic substrate by stamping (i.e. pressing) or hot stamping. A master may also be fabricated which is suitable for forming a sub-master that can be used to form the hollow core waveguides in the plastic substrate. Hollow plastic waveguides can thus be formed and coated with a reflective coating. The plastic hollow core waveguides that carry the reflective coating may also be formed from plastic or a polymer. For example, the hollow core waveguides could be formed using a lithographic process on a "spin-on" polymer coating (e.g. SU8 available from Microchem. Corporation)

Although a simple PLC is described with reference to FIG. 3, a person skilled in the art would recognise that the present invention is equally applicable to complex PLCs. For example, multiple optical components could be mounted on the PLC and linked via hollow core waveguide formed from the PLC substrate. Such PLCs could form the basis of optical signal processing, and/or optical signal routing and analysis system. Some examples of such PLCs are given below.

Referring to FIG. 4a, hollow core waveguide structures 60a, 60b and 60c formed in a silicon substrate 62 are shown in plan view. Angled surfaces (e.g. surface 64) are provided to guide the light through 90°.

To minimise phase perturbations on reflection, the angled surfaces 64 ideally require a surface finish that is flat to better than λ/10 or more preferably to better than λ/20. If using a wavelength of 1.5 µm, a surface finish fiat to better than 150 nm is thus required. This level of accuracy is readily attainable using micro-fabrication techniques which can typically provide a resolution of 30-50 nm.

The angled surfaces 64 thus provide mirrors that allow sections of hollow waveguide to be orientated at any angle to one another. It would not be possible to bend an optical fibre cable through such an acute angle. If a similar circuit were to be fabricated using known SiOB techniques, it would be necessary to provide two sections of optical fibre with a separate (well aligned) mirror to couple light between the optical fibre sections. The present invention can thus provide more complex and compact circuit layouts than prior art SiOB devices.

Although monolithic mirrors are shown in FIG. 4a, it should be recognised that a hybrid arrangement could also provide the same optical function. For example, alignment slots could be fabricated to receive in alignment polished mirrors. The hybid arrangement is useful as it allows the use of high optical quality mirrors that can be designed to have a minimal polarisation dependence; for example they may carry a polarisation independent multiple layer coating.

The waveguide structures described with reference to FIG. 4a are all substantially straight and connected by appropriately placed mirrors. However, the hollow waveguide structures could also be curved. For example, and with reference to FIG. 4b, a curved waveguide 66 formed in a silicon substrate 62 is shown. A skilled person would recognise that the maximum curvature attainable would depend on the guide thickness.

Figure 5A:
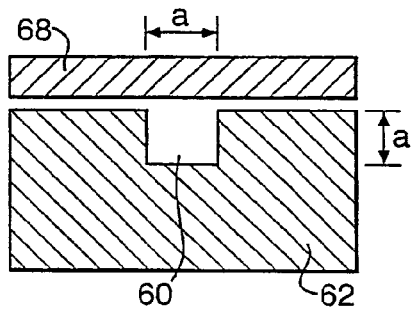

Referring to FIG. 5a, a cross section through a hollow core waveguide structure 60 of the type described with reference to FIG. 4a is shown. The hollow core waveguide structure 60 is formed in the silicon substrate 62, and a silicon lid portion 68 is also provided that can be attached to the substrate 62 in the manner described above to provide the required hollow core waveguide.

Figure 5B:
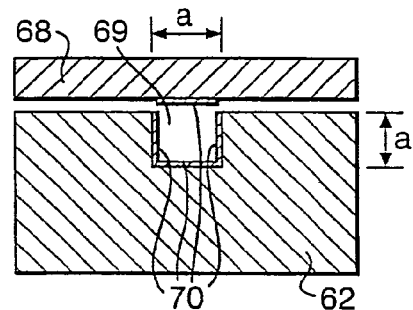

As shown in FIG. 5b, the internal surfaces of each of the walls forming the hollow core 69 may additionally be coated with a layer of material 70, for example copper, gold or silver to enhance the reflectivity of the 1.55 µm radiation via TIR.

If guiding linearly polarised light of known polarisation, hollow core waveguides in which different internal surfaces have different optical properties can be provided to further decrease the optical losses associated with the waveguide.

FIG. 6 shows the Fresnel Reflection coefficient for light incident on a surface from air at an angle of 86° as a function of the refractive index (n) and absorption (k) of that surface for s-polarised ($R_s$) and p-polarised ($R_p$) light. It can be seen from FIG. 6 that the Fresnel reflection coefficient is strongly dependent on the polarisation of the light. Therefore, if the polarisation state of the light that is to be guided by a rectangular hollow core waveguide is known a pair of opposed surfaces forming the waveguide could be configured to have a low refractive index to optimise reflectivity for p-polarised light whilst the second pair of opposed surfaces could be arranged to have a much higher refractive index to maximise reflectivity for s-polarised light.

A number of techniques are described with reference to FIG. 7 that can be used to form waveguides in which different internal surfaces have different optical properties.

Figure 7A:
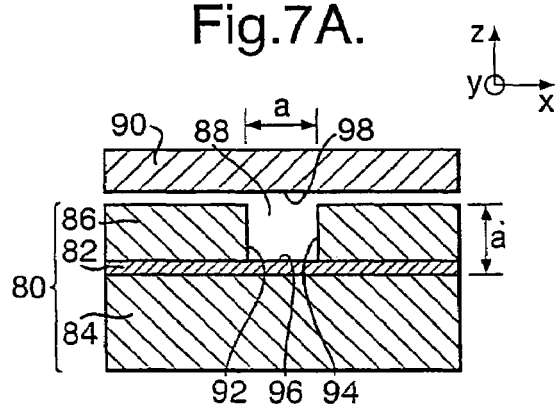

FIG. 7a illustrates a hollow waveguide formed in an SOI wafer 80 fabricated using silicon on insulator (SOI) fabrication techniques. The wafer 80 comprises an insulating layer 82 of $SiO_2$ material carried on a substrate 84 and having a layer of silicon 86 located thereon. The layer of silicon 86 is etched down to the insulating layer 82 to form the required channel 88. A lid portion 90 formed from $SiO_2$ material is also provided.

A hollow core waveguide is thus formed having a first surface 92 and a second surface 94 that consist of silicon, whilst a third surface 96 and a fourth surface 98 are silicon dioxide. The refractive index of silicon is around 3.5, whilst silicon dioxide has a refractive index of around 1.5. Hence, optical losses in the waveguide are reduced when light propagating in the y-direction along the waveguide is polarised in the z-direction; i.e. there is Rs reflection at the first surface 92 and second surface 94 and Rp reflection from the third surface 96 and fourth surface 98.

Figure 7B:
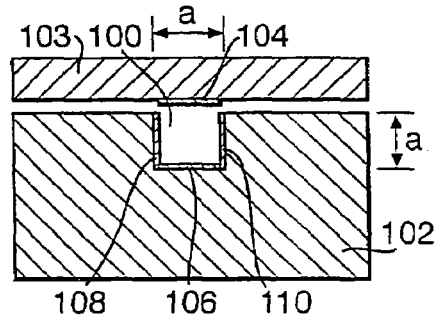

Referring to FIG. 7b, a hollow waveguide 100 formed in a silicon substrate 102 and having a lid portion 103 is shown. The upper wall 104 (i.e. the wall defined by the lid portion 103) and the lower wall 106 are coated with a first material, whilst the side-wall 108 and side-wall 110 are coated with a second material. The first material and second material are selected to have low and high refractive indices respectively in order to minimise optical losses of light polarised in the z-direction that propagates along the waveguide in the y-direction.

Although FIG. 7b shows coatings applied to all four walls of the waveguide, it would be appreciated that only a single wall, or a pair of opposed walls, could be coated as required. In other words, one or more of the walls could remain uncoated and thus have the optical properties of the semiconductor material used to form the substrate.

Figure 7C:
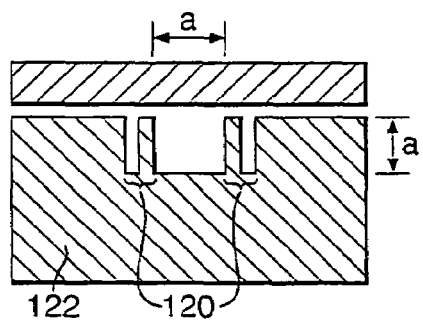

Furthermore, physical structures can be formed in silicon to enhance reflectivity for a given polarisation of light as required. FIG. 7c shows how a hollow core waveguide can be formed in a silicon substrate that comprises etalon side-wall structures 122. In this case, the etalon side-wall structures will enhance reflectivity. Although an etalon structure is shown in which the hollow portions are filled with air, another material (e.g. a liquid or gas) could be used instead of air to enhance reflectivity.

Figure 7D:
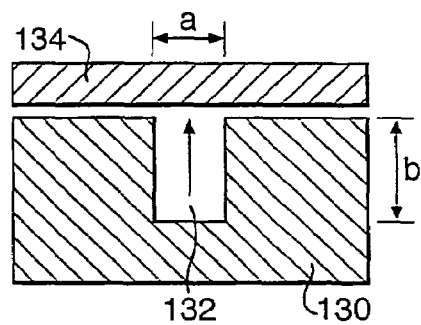

The optical losses associated with hollow core waveguides can also be reduced further by controlling the shape of the waveguide core. For example, the wider the waveguide core, the lower the associated optical losses. FIG. 7d shows a rectangular cross-section waveguide 132 formed in a silicon layer 130 and having a silicon lid portion 134. The hollow core of the waveguide 132 has a width "a" that is less than its depth "b". Light polarised in the z-direction and propagating along the waveguide 132 will thus experience lower losses than if it were to propagate through a waveguide of depth "a".

It should further be noted that structures can be formed in a PLC in which light is guided in only one plane; for example, it could be arranged for there to be free-space propagation along a vertical axis but waveguiding on the horizontal axis. In this case the waveguides are referred to as planar waveguides; i.e. they only guide in one plane. Planar waveguides may be employed where beam expansion in one dimension is required whilst constraining the beam width by guiding in a second dimension. If guiding is required in only the horizontal plane, a lid portion is not required. The converse situation is also possible where light is guided between the lid and the floor of the waveguide but not in the lateral plane.

Referring to FIG. 8, it is demonstrated how beam splitters and polarisation filters may be formed in a hollow waveguide PLC.

FIG. 8a shows a beam splitter fabricated from hollow waveguide structures formed in a silicon substrate 160. The beam splitter comprises an input hollow core waveguide 162, a first output hollow core waveguide 164 and a second output hollow core waveguide 166. Light propagating through the input hollow core waveguide 162 is partially reflected from a thin silicon wall 168 into the first output hollow core waveguide 164 and also partially transmitted and coupled into the second output hollow core waveguide 166.

The angle (θ) between the input hollow core waveguide 162 and the first output hollow core waveguide 164 determines the angle of incidence of light on the thin silicon wall 168. As shown in FIG. 8c, the reflectance properties of silicon depends on both the angle of incidence, and the polarisation state, of the incident light. The relative proportion of the power coupled from the input hollow core waveguide 162 into the first and second output hollow core waveguides 164 and 166 can thus be selected by fabricating the device with a certain angle (θ). Furthermore, as shown in FIG. 8b, a polarisation splitter can be fabricated by arranging for the angle θ to equal the Brewster angle. In this case, an angle of θ=74° will result in light polarised in the z-direction being routed from the device via the first output hollow core waveguide 164 whilst light polarised in the x-direction will be routed from the device via the second output hollow core waveguide 166.

An etalon filter may be formed in a device of the type described with reference to FIGS. 8a and 8b instead of the thin silicon wall 168. This would provide an optical element that would have different reflective properties for different wavelengths of light, and hence the device could also operate as a spectral filter.

Although a monolithic beam splitter and Brewster plate are described, the skilled person would also appreciate that a similar optical function could be implemented using a hybrid arrangements. Alignment slots could be formed in the substrate to receive the necessary optical components.

Referring to FIG. 9, it can be seen how the silicon material of a substrate can also be formed to provide a light focussing function.

FIG. 9a shows a silicon substrate 190 in which a silicon lens structure 192 and hollow core waveguide 194 have been formed The lens structure 192 will act as a lens to enable light 196 guided along the hollow core waveguide 194 to be focussed to a point 198. Such lenses may be used, for example, to focus light to a detector element.

As shown in FIG. 9b, a shaped silicon reflector 200 can also be formed in a silicon substrate 202 to optically link hollow core waveguides. The reflector 200 performs the function of routing light through a certain angle (in this case 90°) from a first hollow core waveguide 204 to a second hollow core waveguide 206 whilst also focussing light 208. Again, such an element may be used in a variety of different ways in PLCs and would be relatively simple to realise as it does not require an anti-reflection coating.

Although a PLC of the type described herein may comprise a complete optical circuit, it may also be necessary to couple light into or out of a PLC, typically via optical fibres.

FIG. 10 shows a PLC formed in a silicon substrate 220 and arranged to receive light from a first input optical fibre 222. The input optical fibre 222 has a hollow core, and light therefrom is coupled into the input hollow core waveguide 224 using an input ball lens 226. Light propagating along the input hollow core waveguide 224 is directed to an etalon structure 228. The etalon structure 228 spectrally filters light into the first output hollow core waveguide 230 or the second output hollow core waveguide 232 depending on its spectral characteristics. Light propagating through the first output hollow core waveguide 230 is coupled in to a first output optical fibre 234 via ball lens 236, and light propagating through the second output hollow core waveguide 232 is coupled in to a second output optical fibre 238 via ball lens 240. Again, a hybrid etalon filter could be used instead of the monolithic element shown.

Although ball lenses are shown in FIG. 10, other lenses such as GRIN rod lenses may alternatively be used The etalon structure 228 may also be replaced with beam splitter or a Brewster plate as necessary. The optical fibre may be single or multiple mode as required.

SOI technology is particularly suited to forming PLCs to which optical fibre are coupled. This is because typical SOI wafers comprise a silicon layer that has a thickness which is very accurately defined during the manufacturing process. In the fabrication of hollow waveguide structures in the silicon layer of a SOI wafer, the silica insulating layer acts as a vertical "stop" as far as the etching process is concerned. SOI techniques can thus provide sub-μm channel depth accuracy.

The SOI etching accuracy should be contrasted to channel etching in pure silicon which has an accuracy around a few percent of the etch depth. Etching a channel in a pure silicon wafer to take a fibre (stripped to its cladding diameter of 125.0 µm) would produce a 30 µm to 4.0 µm inaccuracy in the depth of the etch channel. As the core of the fibre is typically only 10.0 µm in diameter a vertical misalignment of this magnitude when coupling to/from a fibre from/to some other component (e.g. from a semiconductor laser) could prove detrimental. Therefore, an SOI based fabrication route would have advantages for alignment and waveguide cross-section accuracy which would reduce polarisation dependent losses.

As described above, a PLC of the present invention could comprise hollow core waveguides that allow single or multiple mode propagation. In certain circumstances it may also be necessary to alter the dimensions of the hollow core waveguide; e.g. to efficiently couple light into or out of different optical components.

Figure 11A:
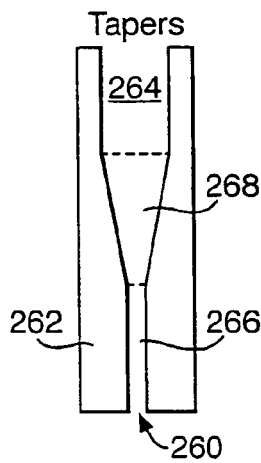
Figure 11B:
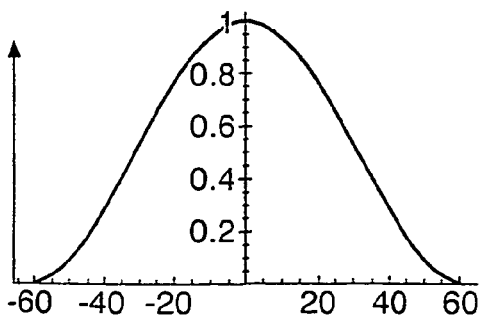
Figure 11C:
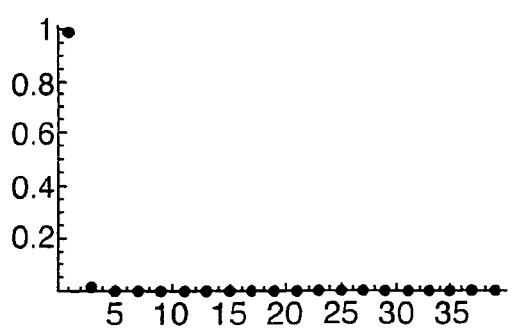

Referring to FIG. 11a, a hollow core waveguide structure 260 formed in a silicon substrate 262 is shown. A wide (125 µm) diameter output waveguide 264 is optically linked to a narrower (62.5 µm) diameter input waveguide 266 via a tapered waveguide portion 268. The length of the tapered portion is 1.875 mm. FIG. 11b shows the intensity field of light propagating in the output waveguide 264 that results from a fundamental mode input beam in the input waveguide 266. As shown in FIG. 11c, the output light in the output waveguide 264 is propagating predominantly in the fundamental mode. In other words, the tapered waveguide allows expansion of the beam size whilst ensuring the majority of the output beam power is coupled into the fundamental mode.

PLCs of the present invention may also comprise hollow core multi-mode interference (MMI) devices formed in the substrate. An example of a beam splitting and beam recombining MMI device is given in U.S. Pat. No. 5,410,625. Variations and improvements to the basic MMI devices of U.S. Pat. No. 5,410,625 are also known. For example, U.S. Pat. No. 5,379,354 describes how variation of input guide location can be used to obtain a multi-way beam splitter that provides division of the input radiation into outputs beams having differing intensities. Use of MMI devices to form laser cavities has also been demonstrated in U.S. Pat. No. 5,675,603. Various combinations of MMI splitter and recombiner devices have also been used to provide an optical routing capability; for example, see U.S. Pat. No. 5,428,698. In all the above cases, the MMI device could be fabricated as hollow core waveguides in silicon, or any other appropriate semiconducting material, and form an integral part of the PLC.

The MMI device may be fabricated from a multi-mode region formed in the substrate to which input and output single mode optical fibre cables are coupled. In this manner, beam splitting/combining can be obtained in which the split beams are images of the input beam.

In particular, rectangular or square cross-section hollow multi-mode waveguides can be designed to provide re-imaging of symmetric, anti-symmetric or asymmetric optical fields by designing the length of the waveguide to have an appropriate relationship to its width. For example, for a symmetric field in a square sectioned waveguide the re-imaging length is given by the square of the waveguide width over the wavelength of the propagating radiation, i.e. $L=w^2/\lambda$, where L, is the guide length, w, is its width, and, $\lambda$ is the wavelength of the radiation. Re-imaging of the symmetric field occurs at this length and multiples of this length, i.e. at $n \cdot w^2/\lambda$, where, n, is an integer number.

For the case of a 50.0 µm wide hollow waveguide and 1.55 µm radiation, the re-imaging length is given by $50^2/1.55=1613$ µm=1.613 mm. The symmetric field would be re-imaged at this length and also at integer multiples of this length, i.e. 3.23 mm, 4.84 mm etc. For example, a $TEM_{00}$ gaussian input beam from a single mode optical fibre could be re-imaged at distances of 1.613 mm. At the re-imaging points any required optical components could be situated. In this manner the re-imaging phenomena provides an additional way of guiding light between a series of components.

Alternatively, for the case of an asymmetric optical field, re-imaging occurs at eight times the length required for symmetric field re-imaging, i.e. at 12.09 mm (8×1.613 mm) for a 50.0 µm wide hollow waveguide. A mirror image of the asymmetric field is also formed at half this length i.e. at 6.05 mm.

In the case of a rectangular waveguide where the horizontal and vertical widths of the waveguide are substantially different the re-imaging lengths associated with the two widths are themselves different. However, by arranging that the relationship between the widths of the rectangular hollow waveguide is such that re-imaging is produced at identical lengths for each width, any field can be re-imaged For example, a symmetric field can be re-imaged in a hollow rectangular waveguide by arranging that the re-imaging lengths, $L_1=n_1 \cdot w_1^2/\lambda$, and, $L_2=n_2 \cdot w_2^2/\lambda$, associated with axes of width $w_1$ and $w_2$, are identical. This can be achieved by making $w_2=(n_1/n_2)^{1/2} \cdot w_1$, here, as previously, $n_1$ and $n_2$ are integer numbers.

Another type of MMI device suitable for inclusion in a PLC of the present invention is the wavelength de-multiplexer described in co-pending PCT patent application number GB2002/004560 and shown in FIG. 12.

The demultiplexer 300 is formed in a silicon SOI substrate 302 and comprises an input fundamental mode waveguide 304, a central multi-mode region 306 and four output waveguides 308a-308d (collectively referred to as 308). The dimensions and positions of the waveguides are selected (as described in GB2002/004560) such that the four wavelengths components entering the multi-mode region 306 from the input fundamental mode waveguide 304 are separated and separately output via the output waveguides 308.

It is also possible to form PLC devices in which light is proximity coupled into adjacent waveguide. Referring to FIG. 13, a first hollow core waveguide 340, a second hollow core waveguide 342 and a third hollow core waveguide 344 formed in a silicon substrate 346 and having a lid portion 347 are shown. The thickness "c" of the silicon walls 348 and 350 is sufficiently thin to enable light to be transmitted to adjacent waveguides. A proximity coupler component of this type may be used as beam splitter; for example to tap off a small percentage of a propagating beam without having to insert a beam-splitting component into the optical path.

Referring to FIG. 14, the PLC may comprise both hollow and solid core (e.g. "ridge") silicon waveguides. This enables the realisation of optical functions in both solid and hollow core technologies.

Figure 14A:
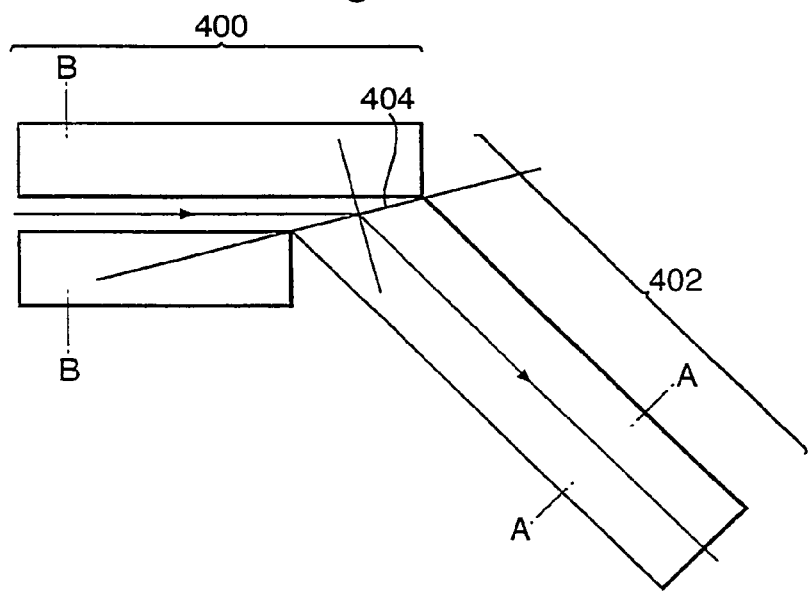
Figure 14B:
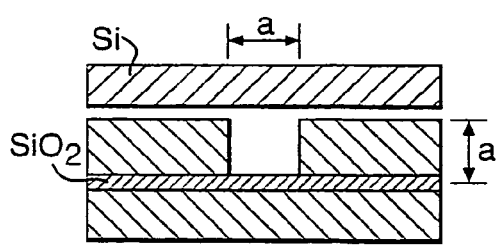
Figure 14C:
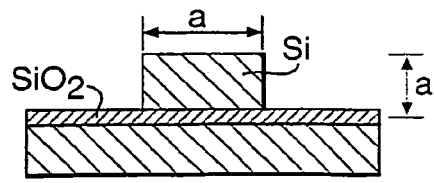

FIG. 14a shows a Brewster interface between a hollow core waveguide 400 and a solid core waveguide 402 both of which are formed on an SOI substrate. FIG. 14b shows a cross-section along B-B of the hollow core waveguide 400, and FIG. 14c shows a cross-section along A-A of the solid core waveguide 402. The hollow core waveguide 400 terminates at the angled interface 404 of the solid core waveguide 402. The waveguide 400 and 402 are arranged such that the interface is at the Brewster angle. This provide efficient coupling between the hollow and solid core waveguides.

Referring to FIG. 15, a hollow core waveguide 450 and an angled surface 452 are shown. The surface 452 is angled at approximately 45° to the plane of the substrate such that light 454 is coupled out of the plane of the substrate. The arrangement shown in FIG. 15 may be used to couple light into or from other circuits or devices located in a different vertical plane to the plane of the substrate. In this manner a three dimensional stacked PLC (e.g. a three dimensional optical switch) could be produced.

One way of monolithically fabricating such a mirror is a precision off-axis cut in [100] silicon material that is offset at an angle of about 8-9°. Numerous alternative ways to manufacture such an angled surface would be apparent to a person skilled in the art. Hybrid mirror arrangements could also be used.

Referring to FIG. 16, experimental data showing the guide length dependent optical transmission characteristics of hollow core optical waveguides suitable for incorporation in a PLC of the present invention are shown.

Curve 500 shows the predicted, and points 502a-502c the measured; optical transmission of a hollow core waveguide formed in a silicon substrate having a square internal core of 50 µm width and depth. Curve 504 shows the predicted, and points 506a-506c the measured, optical properties of a similar waveguide in which a copper coating has been applied to each of its internal surfaces.

Curve 508 shows the predicted, and points 510a-510c the measured, optical transmission of a hollow core waveguide formed in a silicon substrate having a square internal core of 125 µm width and depth. Curve 512 shows the predicted optical properties of a similar waveguide in which a copper coating has been applied to each of its internal surfaces. In all cases shown in FIG. 16 radiation having a wavelength of 1.55 µm was used.

It can thus be seen that increasing the dimensions of a waveguide reduces optical losses and the inclusion of a reflective coating (in this case copper) reduces losses even further. However, allowable angular alignment tolerances are reduced.

Referring to FIG. 17, the effect of angular alignment of components is shown.

Figure 17A:
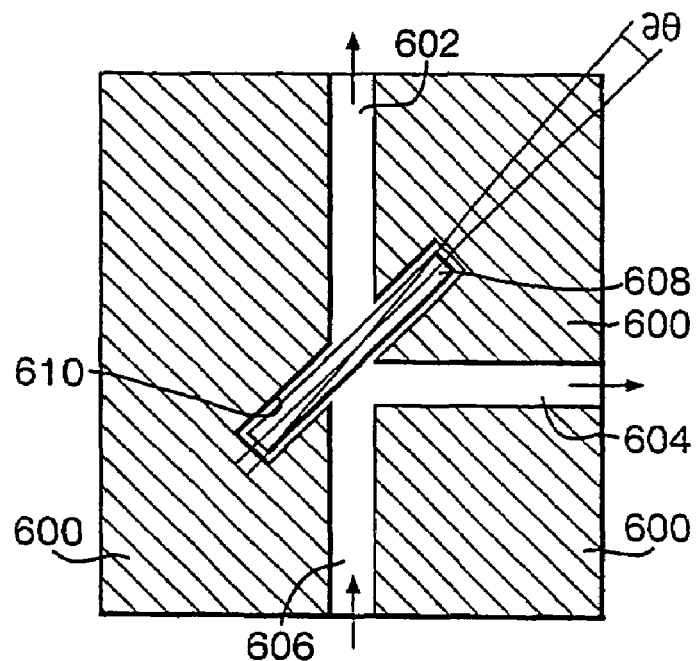

FIG. 17a shows a silicon substrate 600 in which a first hollow waveguide 602, second hollow waveguide 604 and a third hollow waveguide 606 are formed. A beam splitting element 608 is located in alignment slot 610. It can be seen that the element 608 has an angular misalignment ($\partial\theta$) determined by the element and slot manufacturing tolerances.

Figure 17B:
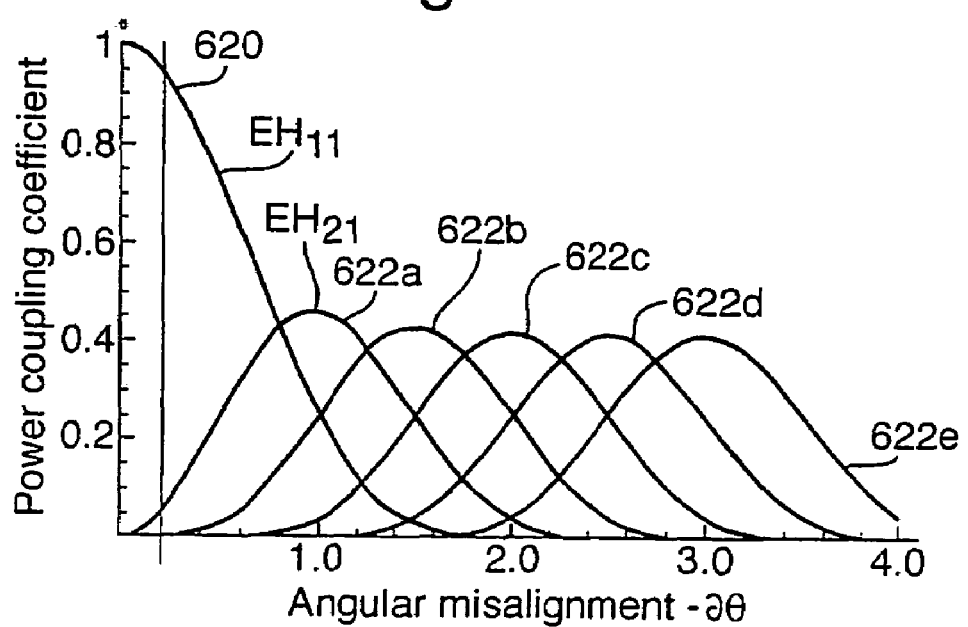

FIG. 17b shows the power coupling efficiency into the various modes of a hollow core waveguide as a function of angular misalignment ($\partial\theta$). Curve 620 shows the power coupled into the fundamental mode, whilst curves 622 show the optical power coupled into the higher order modes.

Referring to FIG. 18, the effect of lateral alignment is demonstrated.

Figure 18A:
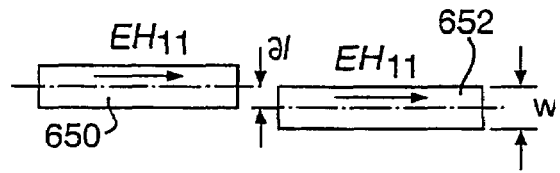
Figure 18B:
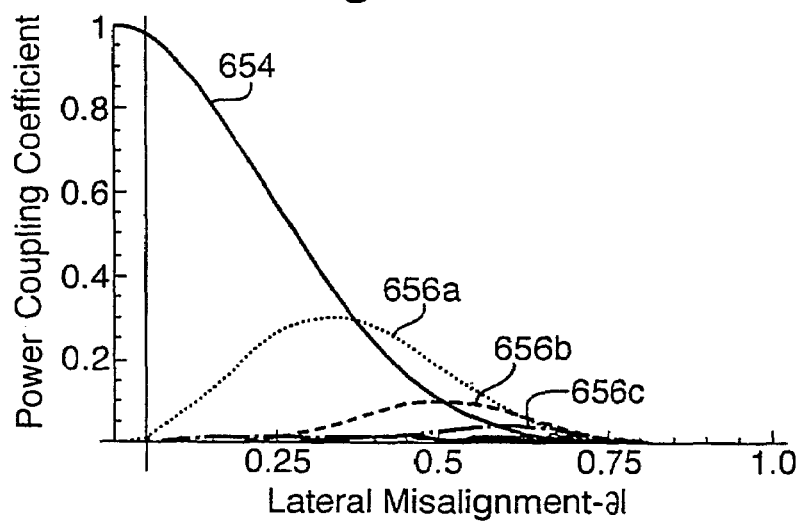

FIG. 18a shows a first hollow core wave guide 650 laterally displaced from a second hollow core waveguide 652 by $\partial l$. The power coupling coefficient as a function of lateral displacement is shown in FIG. 18b where curve 654 shows the power coupled into the fundamental mode, whilst curves 656 show the optical power coupled into higher order modes.

It can be seen from the above that fundamental mode propagation through an integrated system of components interconnected by hollow waveguides can be attained if the waveguide dimensions and alignment tolerances are appropriately selected. This is especially important in a system of components which couples light to/from single mode optical fibres because the amount of power in the fundamental waveguide mode dictates how much light is coupled to/from the single mode fibre. Ensuring high efficiency fundamental mode propagation in the waveguides ensures good coupling to the fundamental mode of a single mode fibre and an overall low insertion loss.

In other words, there is a trade off between the width of the waveguide and the angular and lateral alignment tolerances that are required (of both waveguides and components) in order to ensure that efficient fundamental mode propagation is achieved. Lower attenuation coefficients can be obtained by making the guide cross-section (width) large enough because the attenuation coefficient is inversely related to waveguide width. Making the waveguide width larger also eases lateral alignment tolerances, but it can be seen to tighten angular alignment tolerances.

Referring to FIG. 19, a technique for ensuring accurate alignment of components placed in a slot is shown.

A silicon substrate 700 has a slot formed therein to hold an optical component 702. A number of spring clips 704 (also termed micro-grippers) are formed in the silicon by known micro-fabrication techniques. These clips 704 are such that when displaced they provide a lateral force. In this manner, the component is held firmly in alignment in the slot.

Although FIG. 19 shows clips surrounding the optical component, it is also possible to press the component against a reference surface such as the side-wall of the slot. It would also be appreciated by the skilled person that springs or other MEMS features fabricated by the removal of a sacrificial layer of oxide in a silicon wafer would result in a certain amount of undercut. This undercut would have no effect if associated with alignment slots, and would also make little difference to propagation in a rectangular hollow waveguide where the mode distribution is typically circular or elliptical.

A PLC of the present invention could be used to implement numerous different optical circuits. A few examples of these include interferometers (e.g. Michelson or Mach-Zender), spectrometers, lidar and optical readout of MEM devices (such as sensors or actuators). Telecoms circuits (routers, multiplexers, demultiplexers etc) could also be implemented. Although optical components are described above, there is no reason why the PLC could not alternatively or additionally comprise microwave components and hollow core waveguides to guide the microwave radiation. Opto-microwave integration in a single circuit would thus be possible.

The invention claimed is:

1. A photonic light circuit device comprising:
   a semiconductor substrate;
   a plurality of optical components; and
   at least one hollow core optical waveguide is formed in the plane of the semiconductor substrate to optically link said plurality of optical components, wherein each of the plurality of optical components is retained in an alignment slot formed in the semiconductor substrate, each alignment slot completely defining the alignment of the optical component retained therein with respect to the at least one hollow core optical waveguide, each of said alignment slots intersecting a longitudinal axis of said at least one hollow waveguide within the plane of the substrate.

2. A device according to claim 1 and further comprising at least one optical component formed from the material of the semiconductor substrate.

3. A device as claimed in claim 1 wherein the semiconductor substrate comprises silicon.

4. A device as claimed in claim 1 wherein the semiconductor substrate comprises a silicon on insulator (SOI) wafer.

5. A device as claimed in claim 1 wherein the semiconductor substrate forms a base portion of the photonic light circuit device and a lid portion is additionally provided to form said one or more hollow core optical waveguides.

6. A device as claimed in claim 5 wherein one or more optical components are attached to the lid portion.

7. A device as claimed in claim 5 wherein the lid portion comprises semiconductor material.

8. A device as claimed in claim 7 wherein the semiconductor material at the lid portion is silicon.

9. A device as claimed in claim 7 wherein one or more optical components are formed in the semiconductor material of the lid portion.

10. A device according to claim 1 wherein at least some of the internal surfaces of said one or more hollow core optical waveguides carry a reflective coating.

11. A device as claimed in claim 10 wherein the reflective coating comprises one or more layers of material to provide a surface having an effective refractive index lower than that of the waveguide core within the operating wavelength band.

12. A device as claimed in claim 11 wherein the reflective coating comprises at least one layer of any one of gold, silver or copper.

13. A device as claimed in claim 11 wherein the reflective coating composes at least one layer of dielectric material.

14. A device as claimed in claim 11 wherein the reflective coating comprises at least one layer of Silicon Carbide.

15. A device as claimed in claim 1 wherein at least one of the one or more hollow core optical waveguides support fundamental mode propagation.

16. A device as claimed in claim 1 wherein at least one of the one or more hollow core optical waveguides support multi-mode propagation.

17. A device according to claim 16 wherein the multi-mode region is of a length such that re-imaging occurs.

18. A device as claimed in claim 1 wherein at least one of the one or more hollow core optical waveguides has a substantially rectangular internal cross-section.

19. A device as claimed in claim 18 wherein at least one of the one or more hollow core optical waveguides has a substantially square internal cross-section.

20. A device as claimed in 18 in which the rectangular hollow core optical waveguide has a first cross-sectional dimension parallel to a first waveguide wall and a second cross-sectional dimension orthogonal to said first cross-sectional dimension wherein the first cross-section dimension is at least 10% greater than the second cross sectional dimension.

21. A device as claimed in claim 18 wherein the refractive indices of the surfaces defining the at least one rectangular internal cross-section hollow core optical waveguide are substantially equal.

22. A device as claimed in claim 18 wherein opposite surfaces forming the rectangular internal cross-section hollow core optical waveguide have substantially equal effective refractive indices arid adjacent surfaces forming the rectangular internal cross-section hollow core optical waveguide have different effective refractive indices.

23. A device as claimed in claim 22 wherein a pair of opposed surfaces of the rectangular internal cross-section hollow core optical waveguide carry a high refractive index coating.

24. A device as claimed in claim 1 for operation with radiation within the wavelength range of 0.1 μm to 20 μm.

25. A device as claimed in claim 1 for operation with radiation within the wavelength bands of 3 μm to 5 μm.

26. A device as claimed in claim 1 for operation with radiation within the wavelength bands of 8 μm to 12 μmm.

27. A device as claimed in claim 1 for operation within the wavelength bands of 1.4 μm to 1.6 μm.

28. A device according to claim 1 wherein the semiconductor substrate comprises at least one alignment lot arranged to receive an optical fibre cable and to optically couple said optical fibre cable with one of said one or more hollow core optical waveguide of the semiconductor substrate.

29. A device according to claim 28 wherein a mode matching means is additionally provided in the vicinity of the alignment slot to allow coupling between a the modes of the optical fibre and the analogous modes of the hollow core optical waveguide of a different core diameter.

30. A device according to claim 29 wherein the mode matching means is any one of a GRIN or ball lens.

31. A device according to claim 28 wherein the alignment slot is arranged to receive a hollow core optical fibre.

32. A device according to claim 28 wherein the alignment slot is arranged to received a tensed optical fibre.

33. A device according to claim 1 wherein at least one of said two or more optical components comprises a micro-electro-mechanical (MEMs) device.

34. A device according to claim 1 wherein at least one of said two or more optical components comprises a mirrored surface that is angled to direct light out of the place of the semiconductor substrate.

35. A device as claimed in claim 1 and further comprising at least one micro wave component.

36. A device as claimed in claim 1 wherein the semiconductor substrate additionally comprises a hollow core microwave waveguide.

37. A base portion for a photonic light circuit device according to claim 1, wherein said base portion is arranged such that when combined with an appropriate lid portion at least one hollow core optical waveguide is formed.

38. A base portion for a photonic light circuit of claim 1 comprising a semiconductor substrate in which one or more hollow waveguide channels and a plurality of alignment slots to receive and align an optical component.

39. A method of fabricating a photonic light circuit comprising the steps of taking a base portion as claimed in claim 37 and attaching a lid thereto.

40. A method of fabricating a photonic light circuit device in a semiconductor substrate, said method comprising the steps of:
   micro-fabricating at least one hollow channel and a plurality of alignment slots in said semiconductor substrate wherein the at least one hollow channel comprises at least one hollow core optical waveguides and each of the plurality of alignment slots completely and passively aligns an optical component retained therein, each of the plurality of alignment slots intersects a longitudinal axis of said at least one hollow waveguide within the plane of the substrate.

41. A method as claimed in claim 39 and comprising the ad step of coating the internal surfaces of the hollow channel(s) with a layer of material having a refractive index lower than that of the waveguide core within the operating wavelength band.

42. A method of forming a photonic light circuit comprising the steps of;
   (a) taking a semiconductor substrate in which at least one hollow core optical waveguide and plurality of slots to receive an optical component are formed using the method of claim 40, and
   (b) introducing an optical component into the at least one slot, whereby the step of introducing the optical component into the at least one slot also acts o as to align said optical component.

43. A device according to claim 1, wherein said component is light transmissive.

44. A device according to claim 1, wherein the component is one of an optical fiber, a graded refractive index (GRIN) lens, a ball lens, an optical filter, and an optical splitter.

* * * * *